(12) United States Patent
Huff

(10) Patent No.: US 12,478,962 B1
(45) Date of Patent: Nov. 25, 2025

(54) LOW-COST MICROFLUIDIC DEVICES AND SYSTEMS AND METHOD OF MANUFACTURING

(71) Applicant: CORPORATION FOR NATIONAL RESEARCH INITIATIVES, Reston, VA (US)

(72) Inventor: Michael A. Huff, Oakton, VA (US)

(73) Assignee: Corporation for National Research Initiatives, Reston, VA (US)

( * ) Notice: Subject to any disclaimer, the term of this patent is extended or adjusted under 35 U.S.C. 154(b) by 758 days.

(21) Appl. No.: 17/700,889

(22) Filed: Mar. 22, 2022

(51) Int. Cl.
*B01L 3/00* (2006.01)

(52) U.S. Cl.
CPC ... *B01L 3/502715* (2013.01); *B01L 3/502707* (2013.01); *B01L 3/50273* (2013.01); *B01L 2300/0663* (2013.01); *B01L 2300/087* (2013.01); *B01L 2300/0877* (2013.01); *B01L 2300/0883* (2013.01); *B01L 2300/0887* (2013.01); *B01L 2300/12* (2013.01)

(58) Field of Classification Search
CPC ......... B01L 3/502715; B01L 3/502707; B01L 3/50273; B01L 2300/0663; B01L 2300/087; B01L 2300/0877; B01L 2300/0883; B01L 2300/0887; B01L 2300/12
See application file for complete search history.

(56) References Cited

U.S. PATENT DOCUMENTS

| | | | |
|---|---|---|---|
| 6,592,696 B1* | 7/2003 | Burdon | B01L 3/502707 156/89.12 |
| 2004/0150939 A1* | 8/2004 | Huff | H01G 5/014 361/277 |
| 2007/0060970 A1* | 3/2007 | Burdon | H01L 23/10 607/37 |
| 2010/0246141 A1* | 9/2010 | Leung | H01L 24/82 156/245 |
| 2014/0354513 A1* | 12/2014 | Nair | B23K 26/0006 343/912 |
| 2016/0284642 A1* | 9/2016 | Ganesan | H01L 23/49811 |
| 2020/0286834 A1* | 9/2020 | Yoshihiro | H01L 21/561 |

* cited by examiner

Primary Examiner — Brian J. Sines
(74) Attorney, Agent, or Firm — Nixon & Vanderhye, P.C.

(57) ABSTRACT

A microfluidic device or system and method of manufacture is disclosed wherein a the microfluidic device or system is made from individually processed and patterned layers of LTCC green tape, that is aligned and stacked, and then co-fired to form a LTCC ceramic modules. Subsequently, microfluidic device die and/or integrated circuit device die are bonded to pre-determined areas of the modules and micro-mechanical and/or micro-electro-mechanical devices and/or systems are fabricated into or onto the surfaces of the modules. The modules are aligned bonded together to form the microfluidic devices and systems. The use of LTCC materials and techniques provides a low-cost flexible and easily customizable approach for microfluidic devices and systems that can be designed and transitioned into production with significant development time and cost.

13 Claims, 39 Drawing Sheets

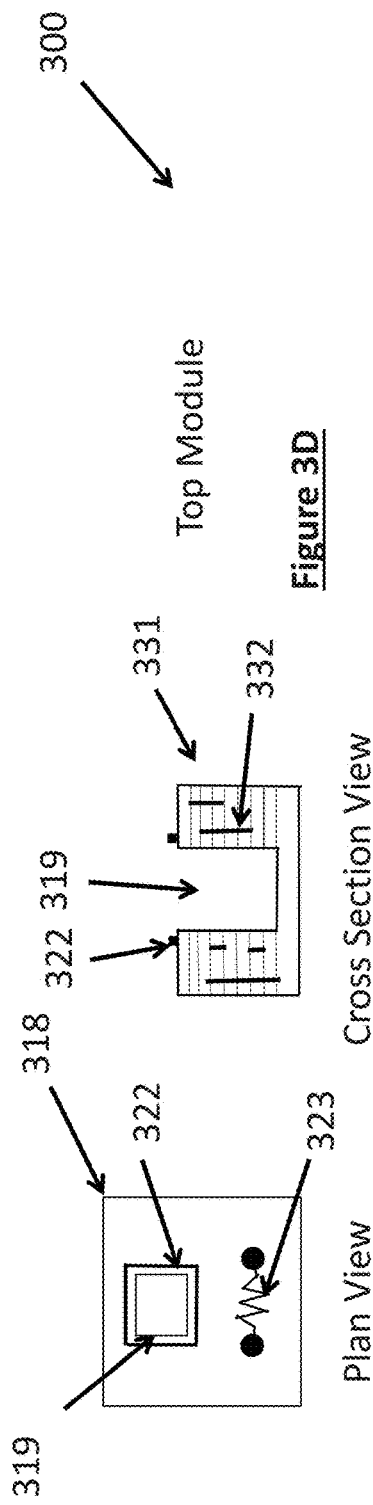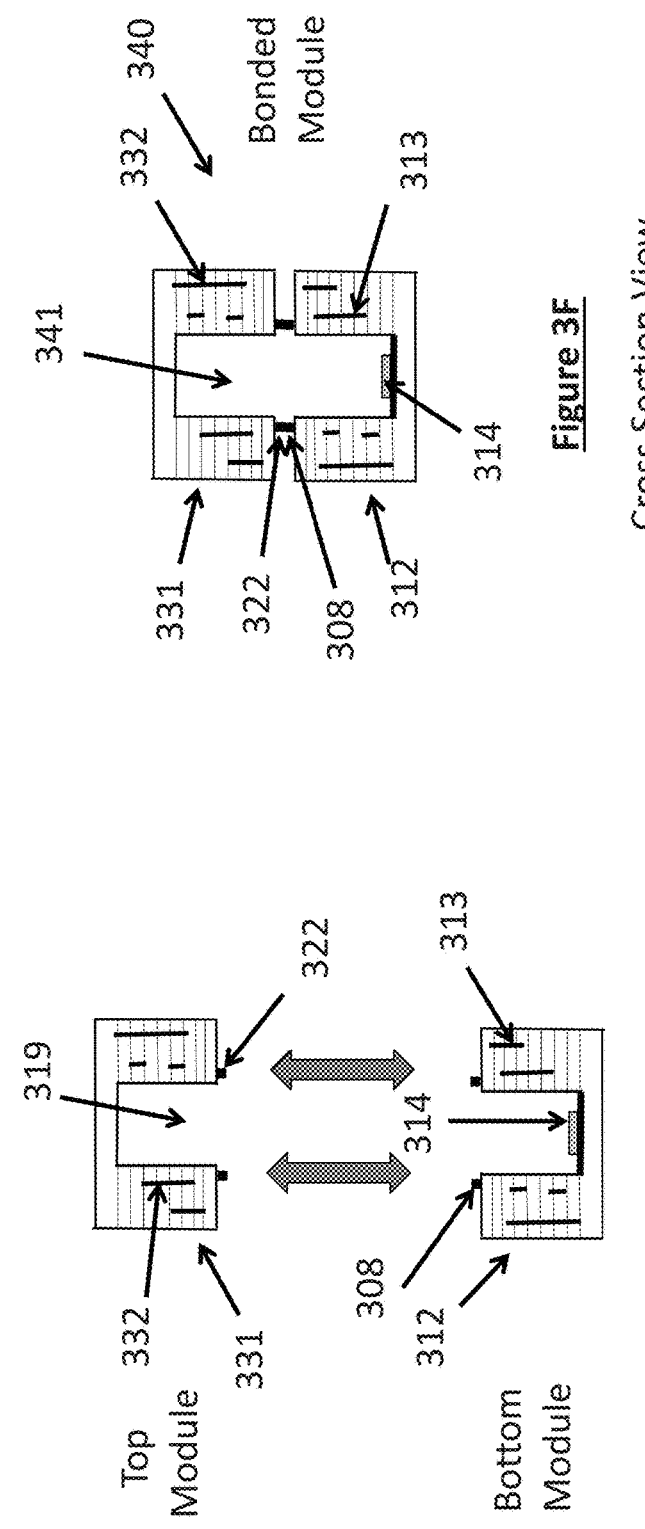

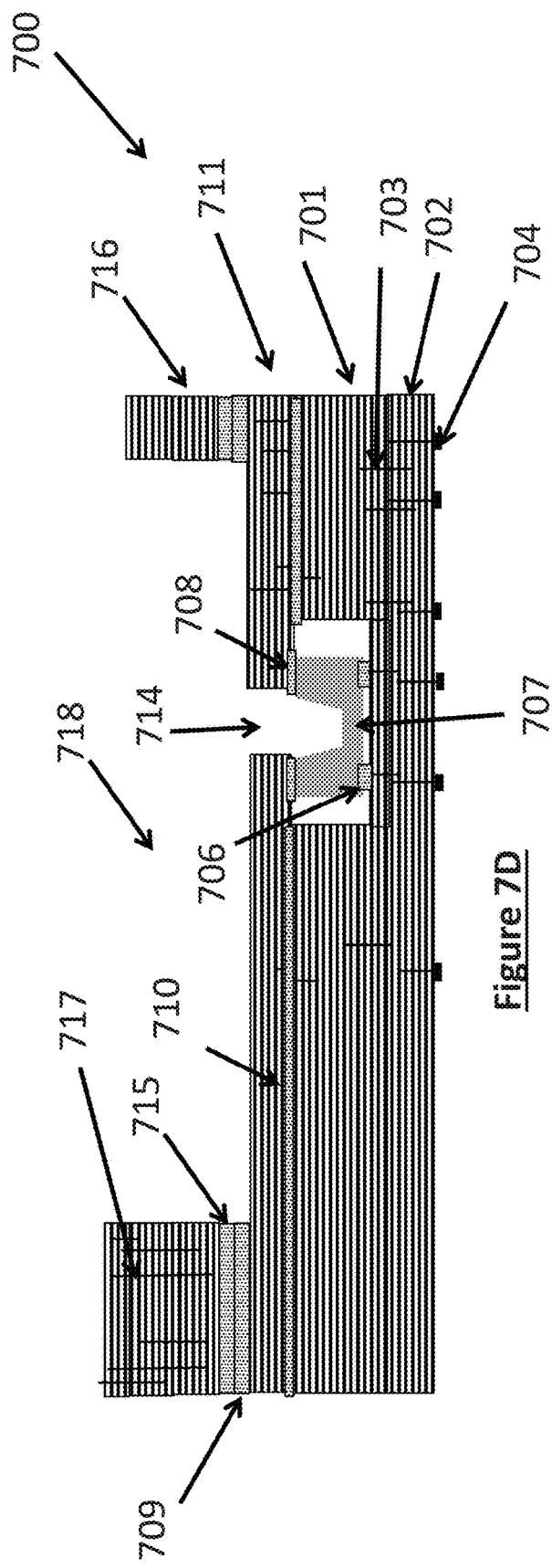
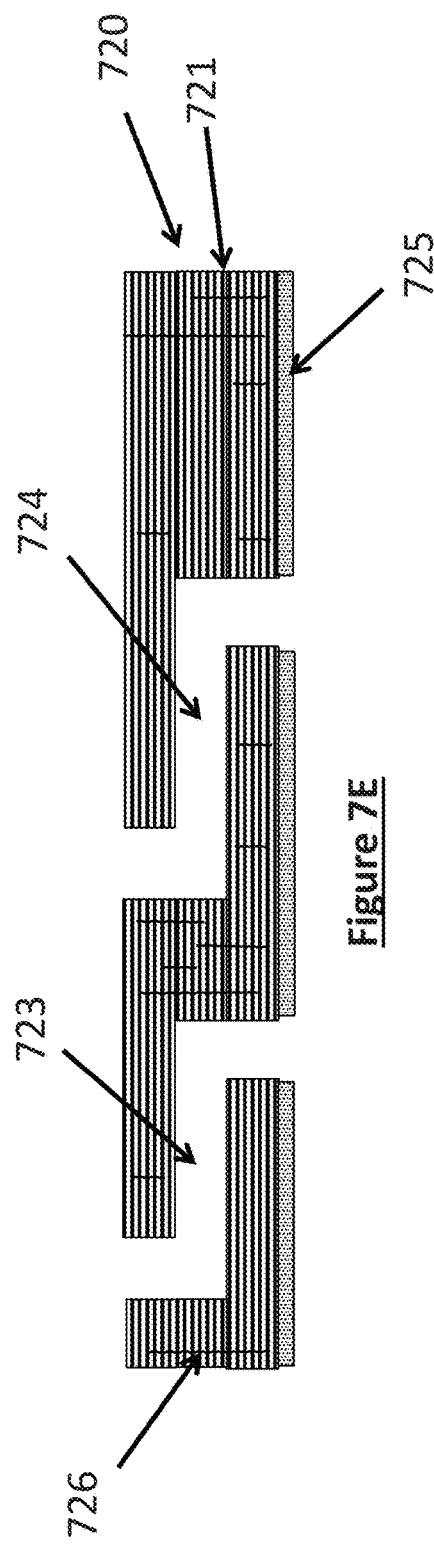
Figure 7D
Figure 7E

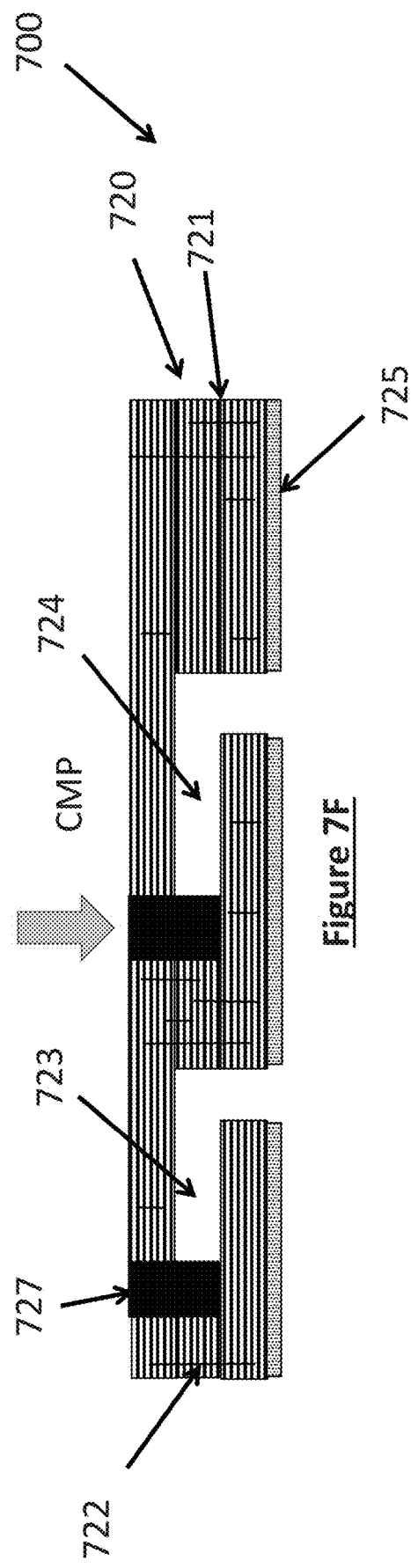
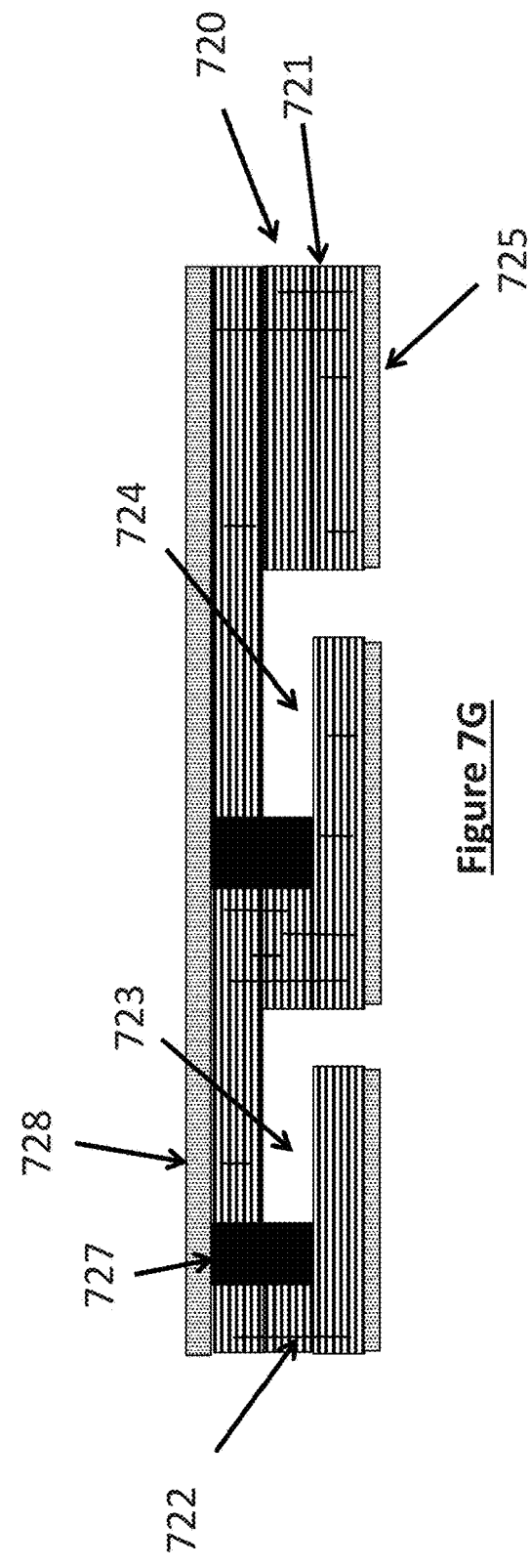
Figure 7F
Figure 7G

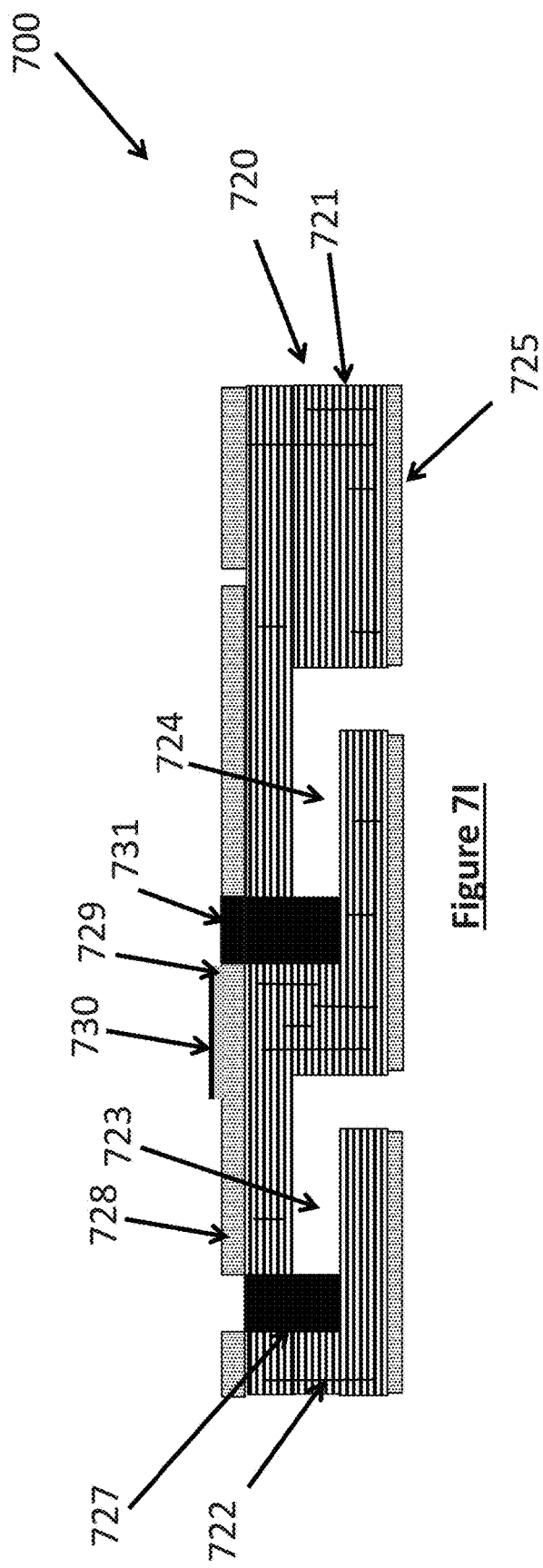
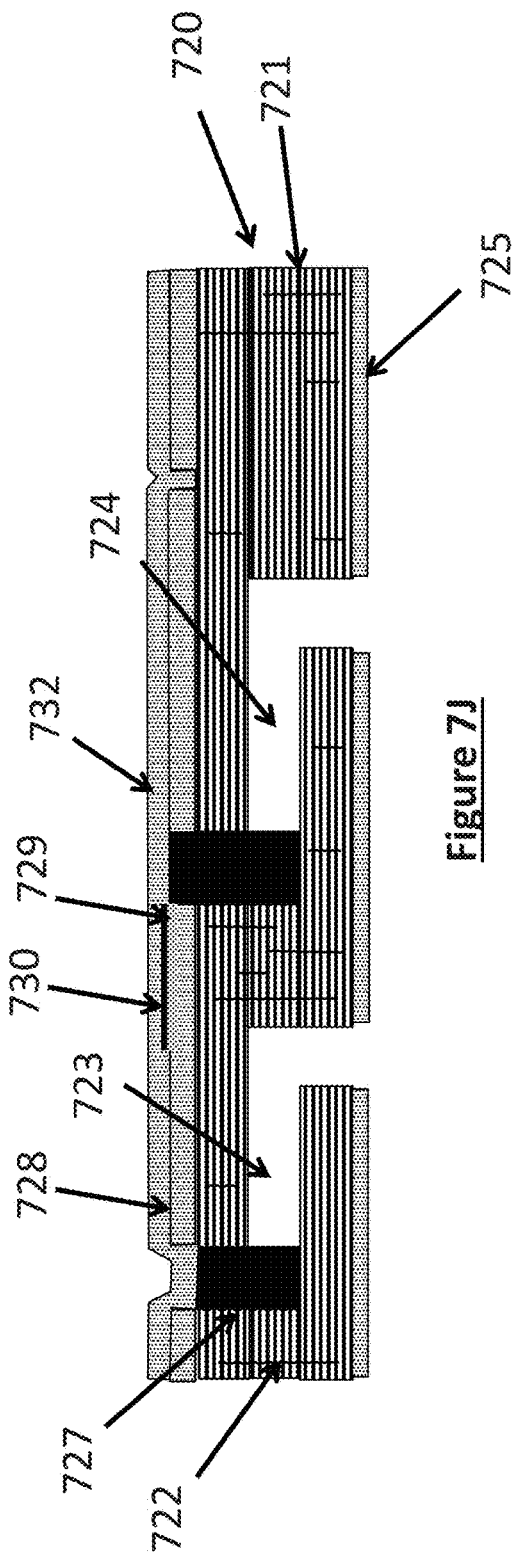
Figure 7I
Figure 7J

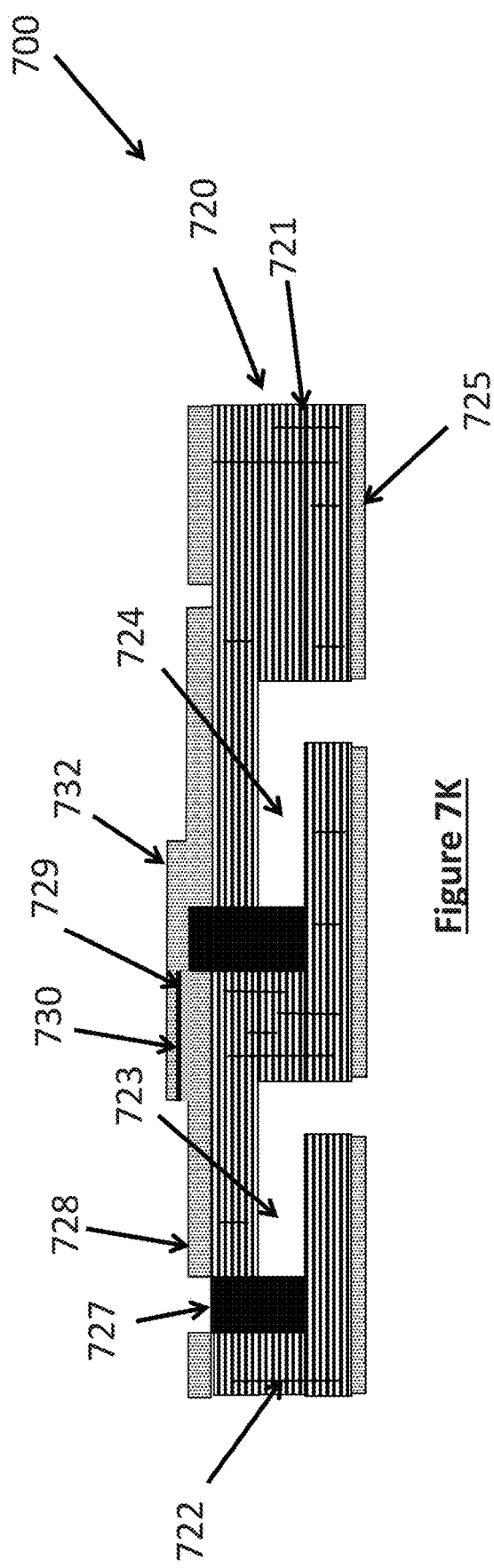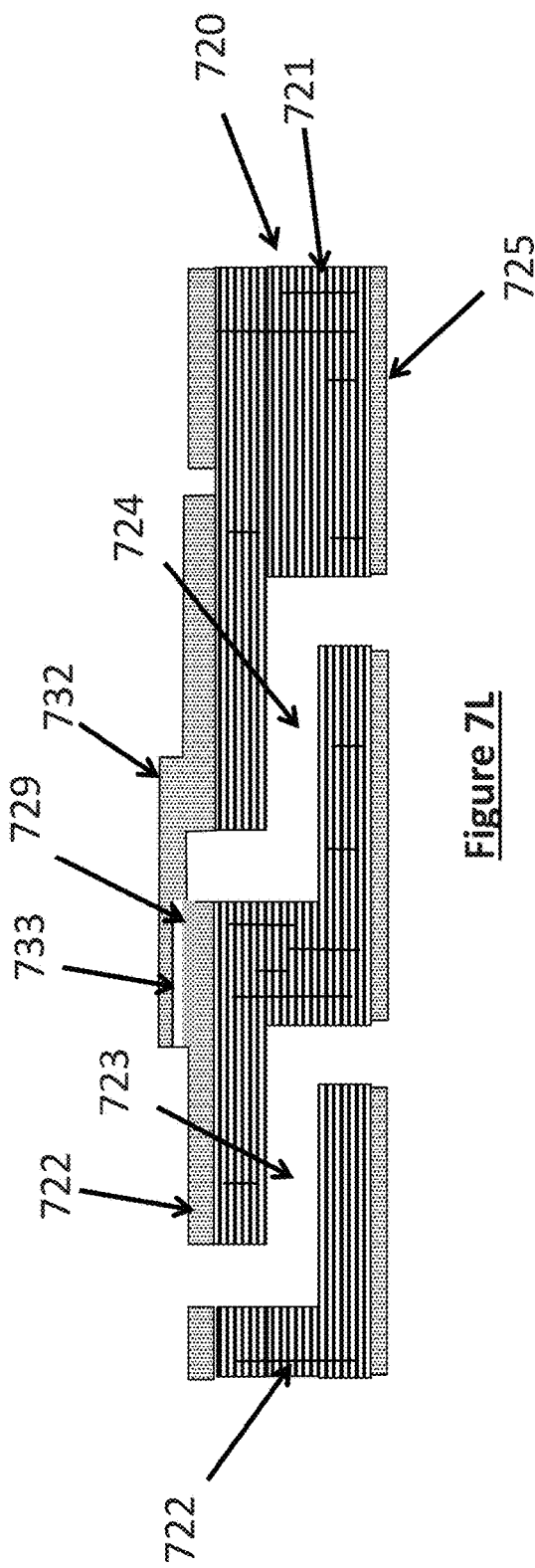
Figure 7K
Figure 7L

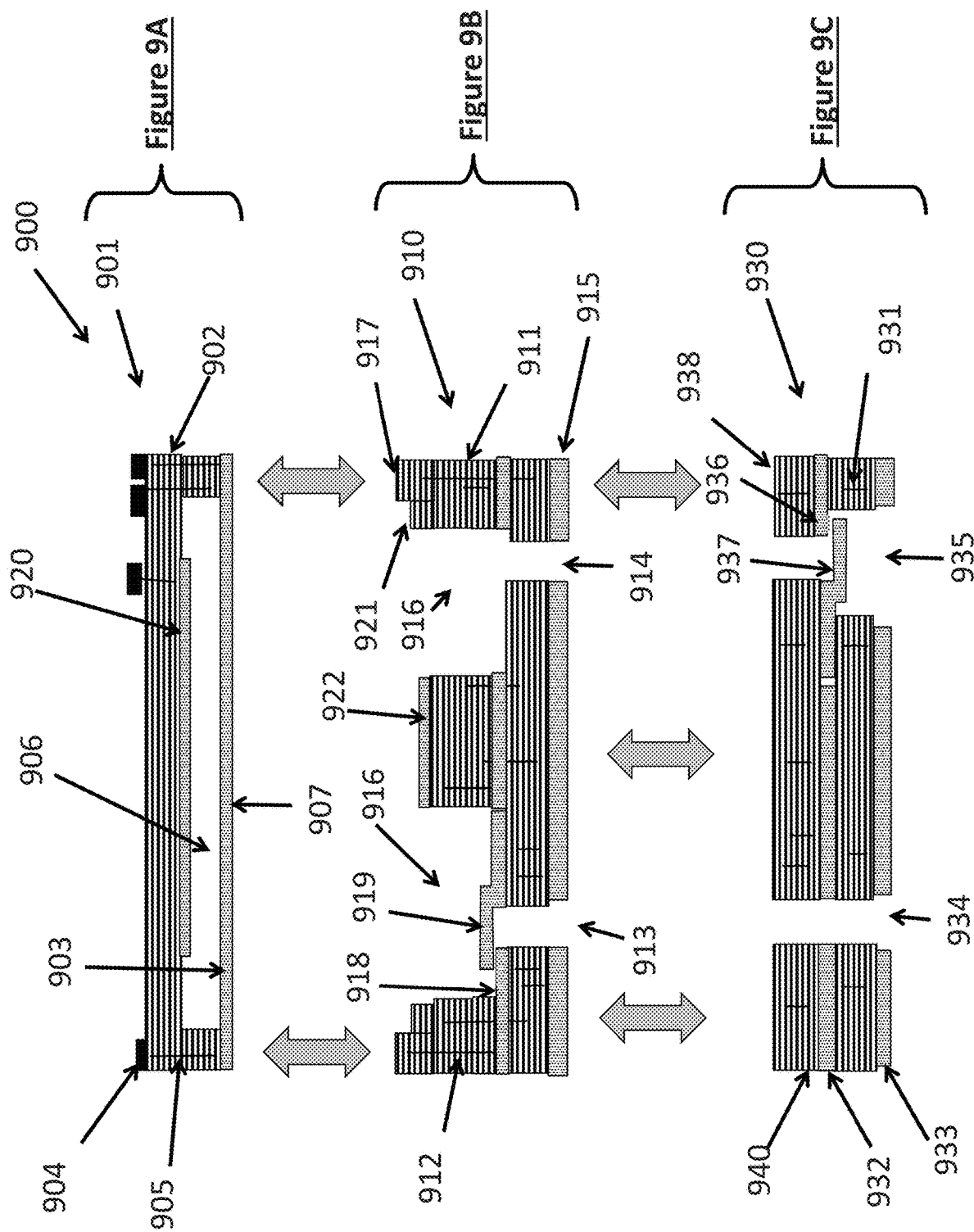

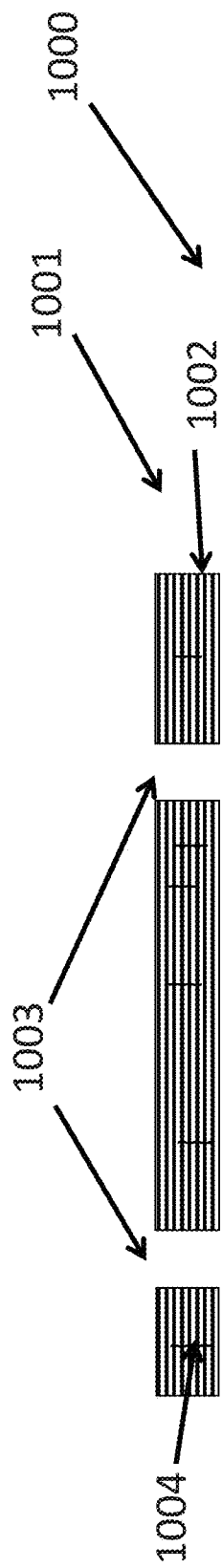
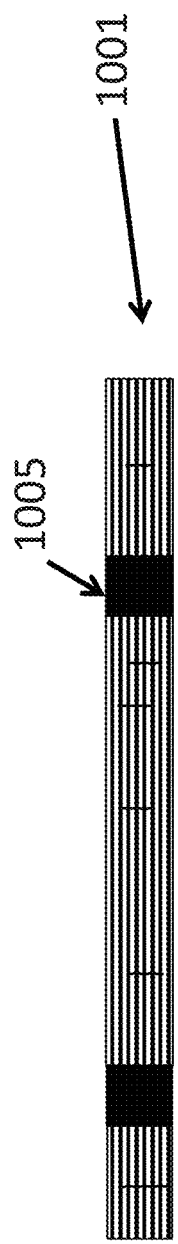
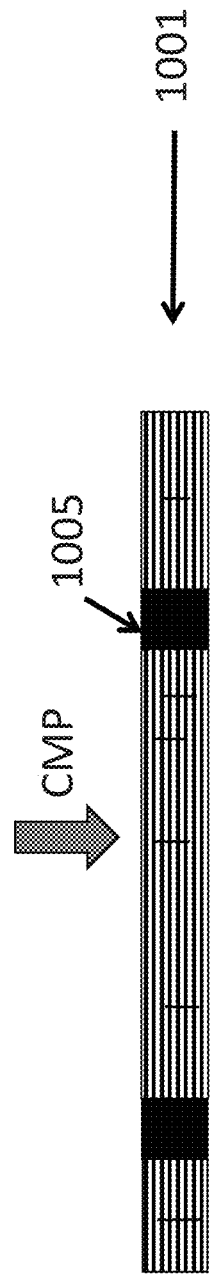
Figure 10A
Figure 10B
Figure 10C

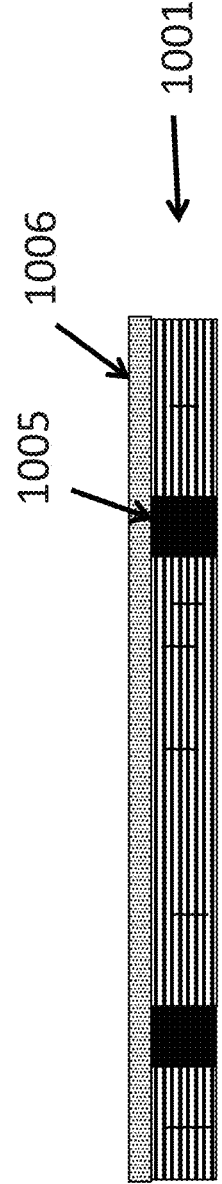
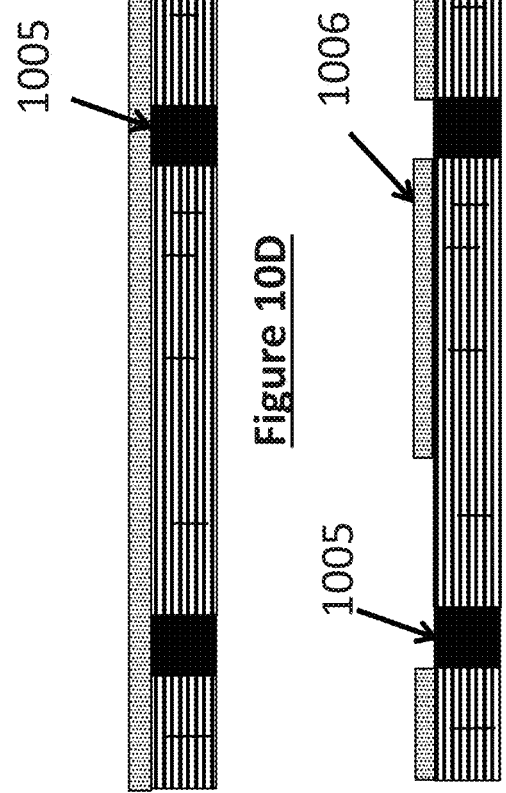
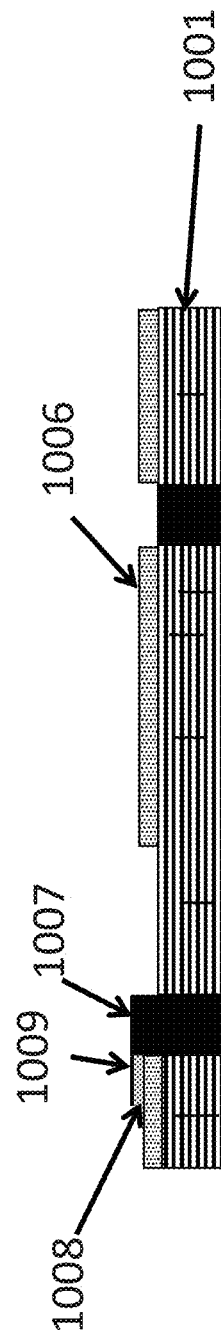
Figure 10D
Figure 10E
Figure 10F

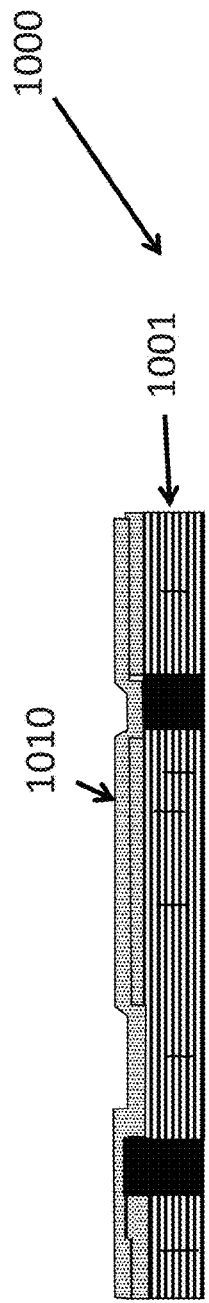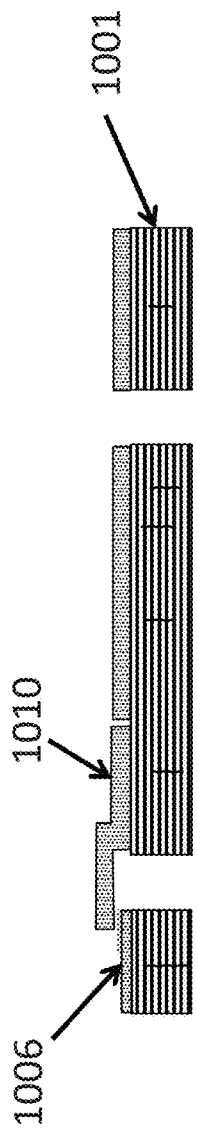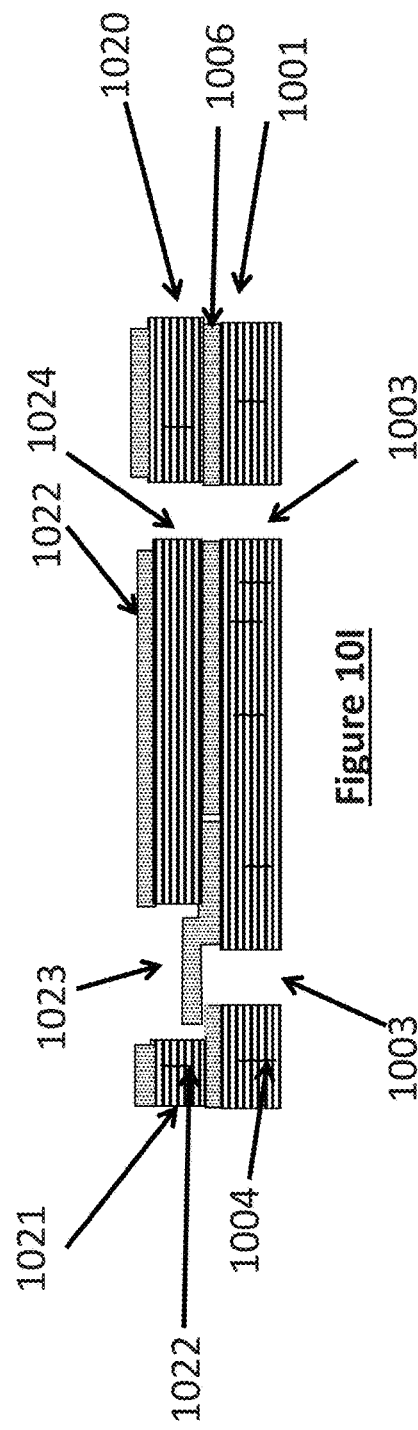
Figure 10G
Figure 10H
Figure 10I

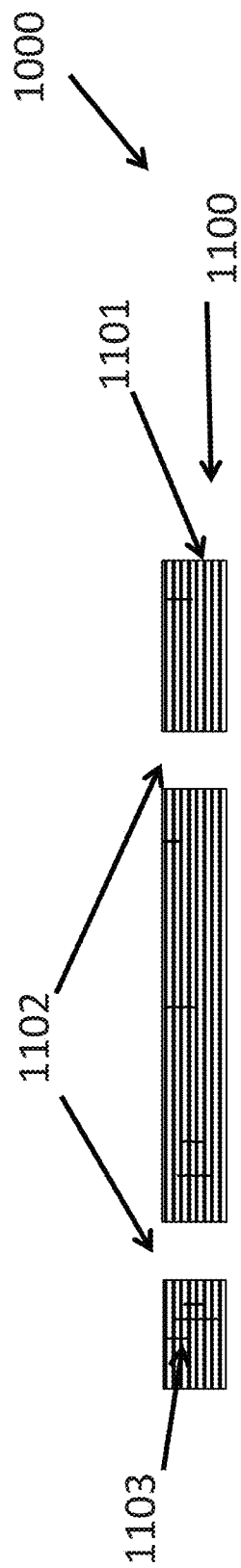
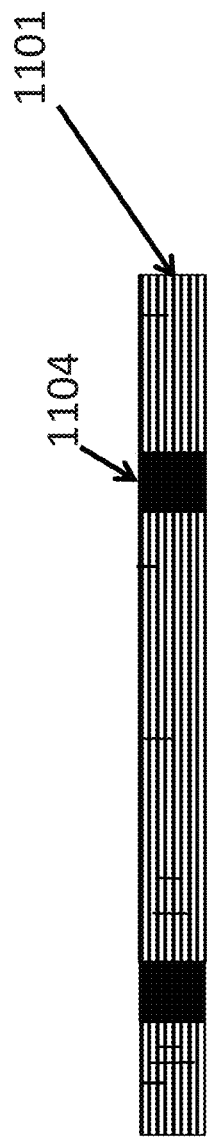
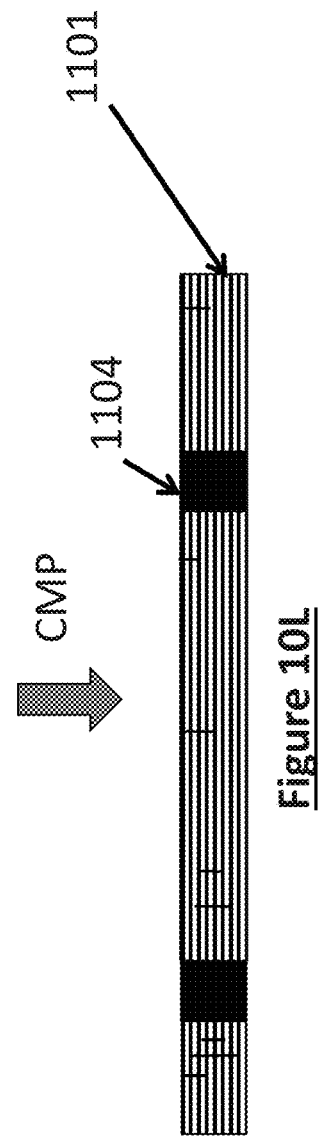
Figure 10J
Figure 10K
Figure 10L

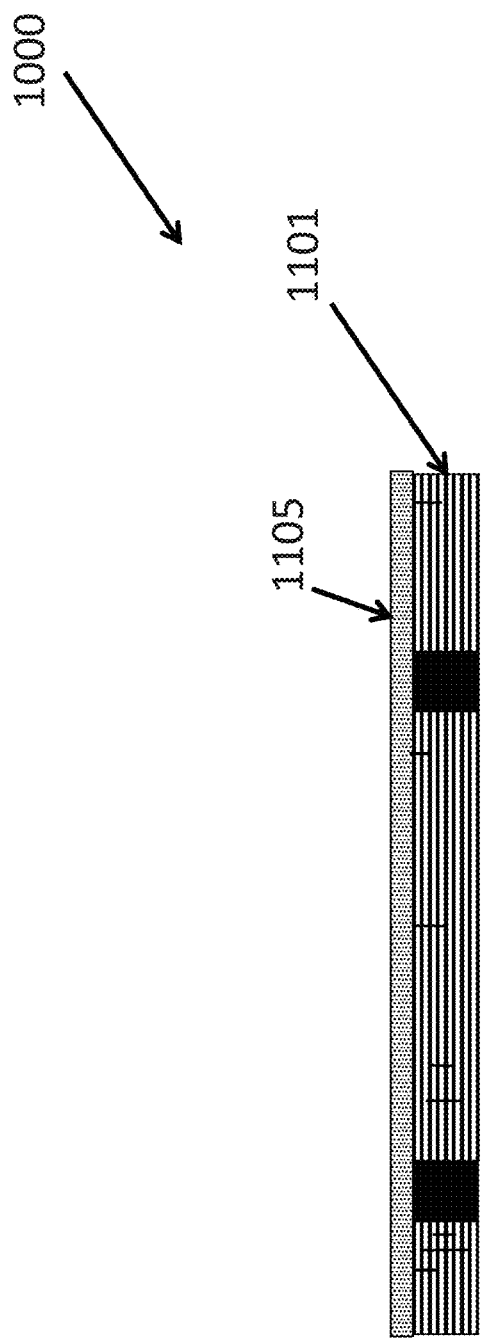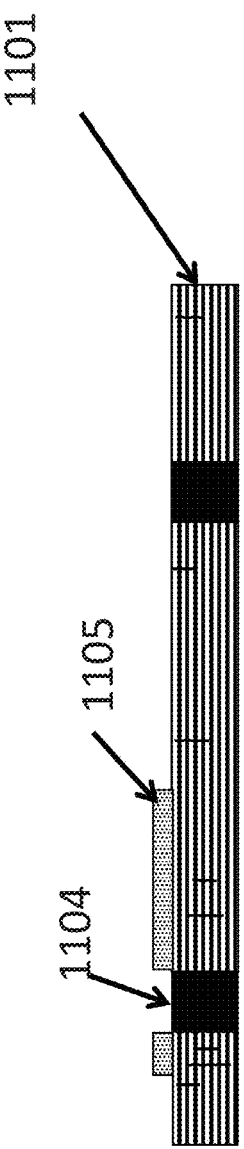
Figure 10M
Figure 10N

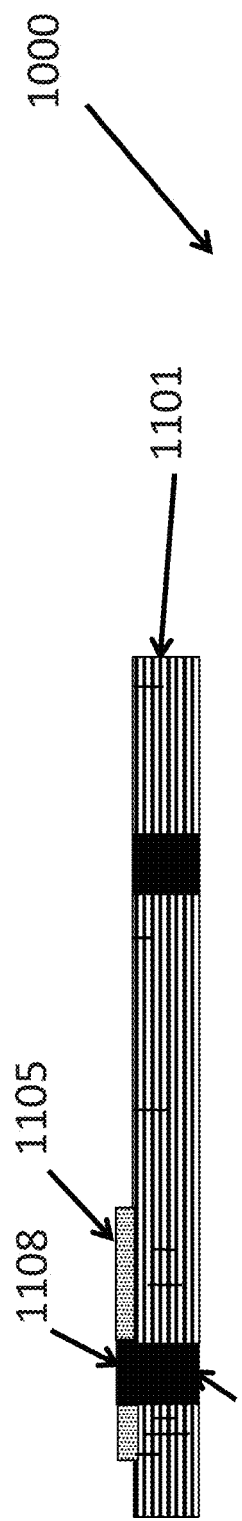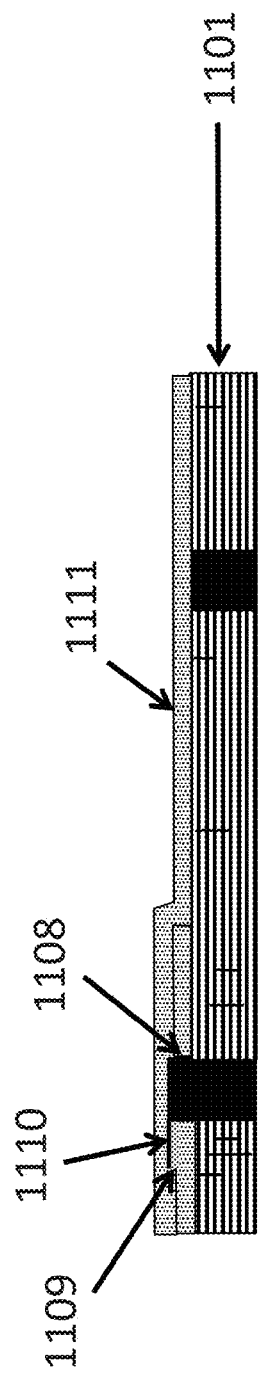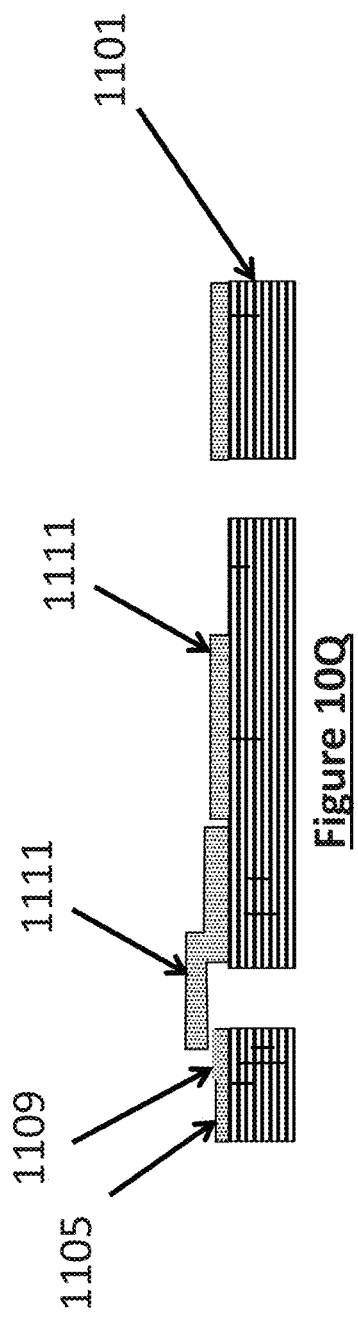
Figure 10O
Figure 10P
Figure 10Q

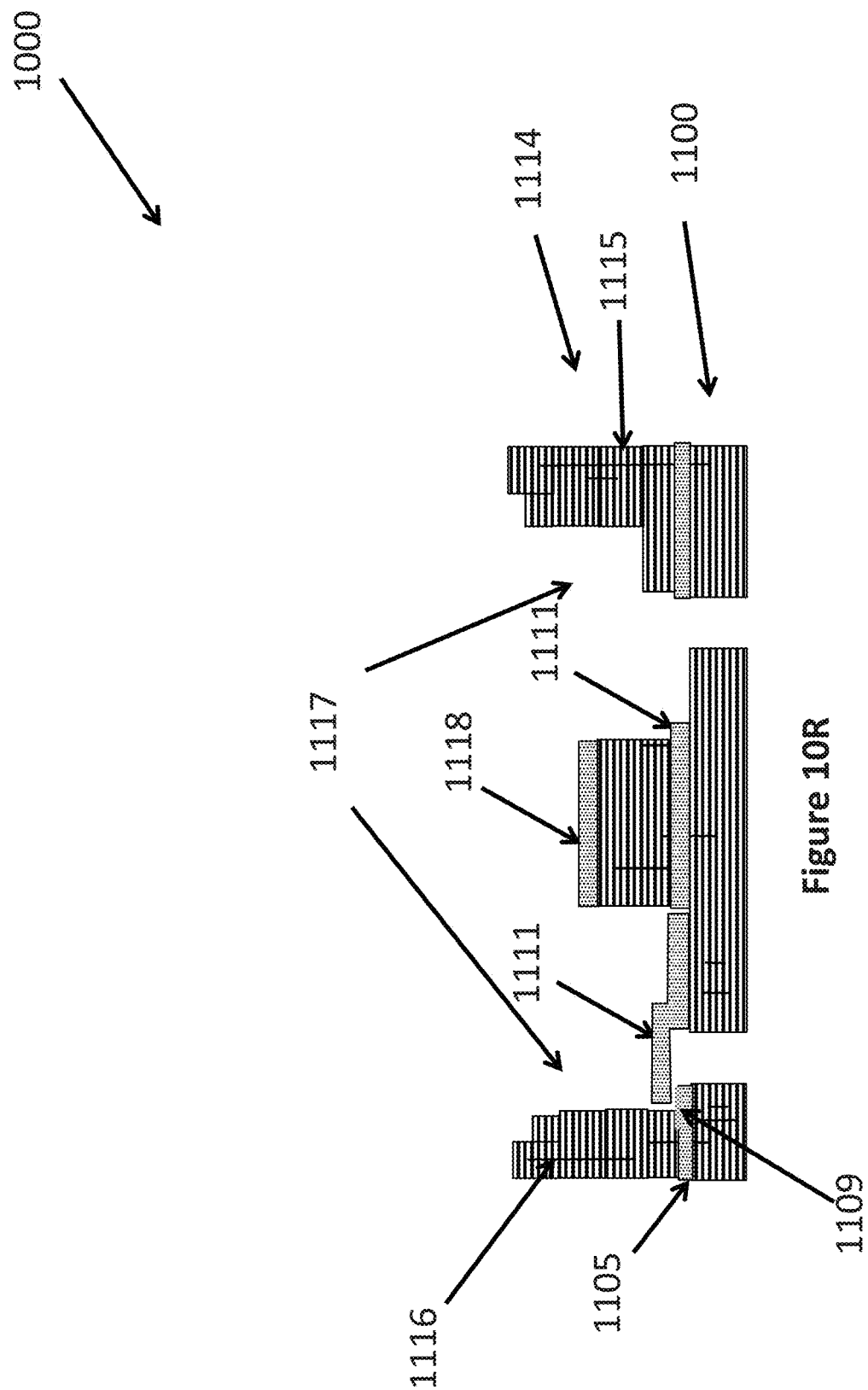

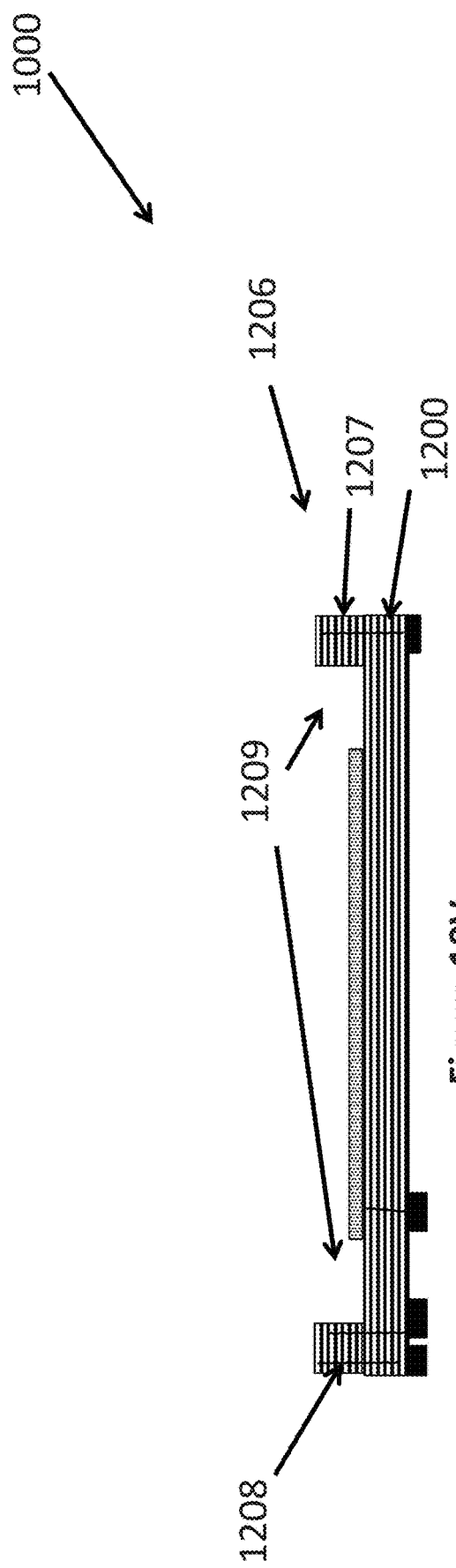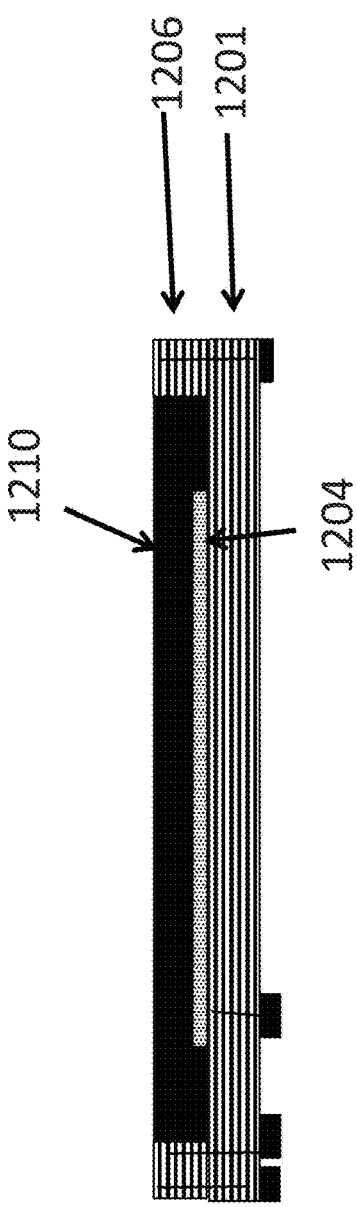
Figure 10V
Figure 10W

1000

1211

1211

1212

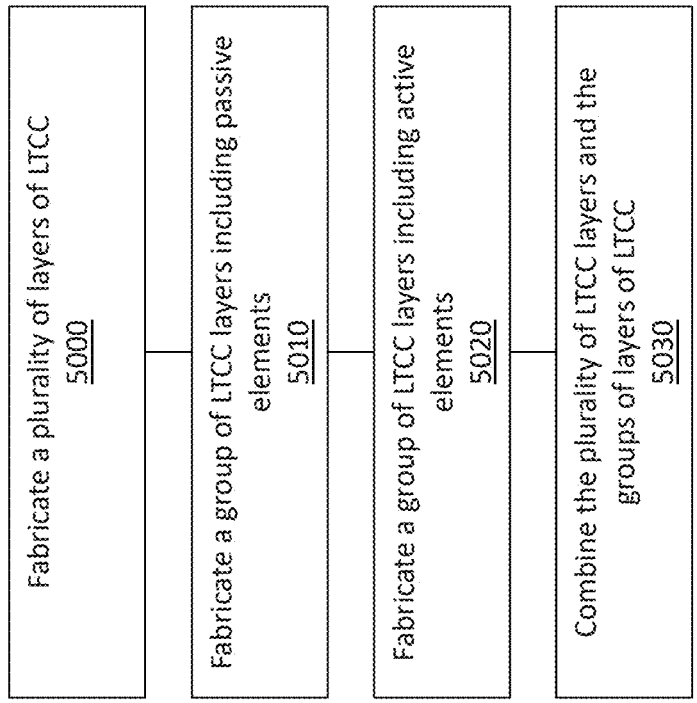

LOW-COST MICROFLUIDIC DEVICES AND SYSTEMS AND METHOD OF MANUFACTURING

FIELD OF INVENTION

The present invention is directed to novel and low-cost microfluidic devices and systems and the method of manufacturing. This invention enables the implementation of any type of microfluidic device including: microvalves; micropumps; mixers; chemical reaction chambers; check valves; pressure sensors; flow sensors; temperature sensors; chemical sensors; biological sensors; flow resistors; flow integrators; shear stress sensors; material property sensors; magnetic sensors; electromagnetic sensors; thermal sensors; hall effect sensors; as well as any device that can be implemented using semiconductor fabrication techniques. This invention also readily allows for the merging of microfluidic devices and systems with integrated electronics and photonic circuits; as well as active electronic and photonic devices such as transistors; diodes; photodiodes; photodetectors; emitters; as well as any device that can be implemented using semiconductor fabrication techniques. This invention also readily allows for the integration of passive components having pre-determined values of resistance, capacitance and inductance. Some of the enormous benefits of the current invention include: the design and manufacturing can be easily customized for most any microfluidic application or product; the development time and cost are low for new design implementations; and the manufacturing cost is very low (as little as a few cents per square inch).

BACKGROUND

Fluidic systems are often composed of a variety of fluidic components, including valves, pumps, flow resistors, pressure sensors, mixers, etc. Fluidic systems can be implemented at the macroscale and the microscale. Fluidic systems implemented at the microscale are often called "microfluidic systems." Most often, microfluidic components are implemented using semiconductor manufacturing methods that are composed of a sequentially performed set of processing steps on substrates. The substrates are usually made of single-crystal silicon, but can be made from other semiconductors as well as glass, ceramic, plastic, or metal. In general, the fabrication process sequences for implementing microfluidic systems are often highly customized for each component. For example, the fabrication process for a microvalve is likely to be vastly different from the fabrication process for a micro-pressure sensor and both will be vastly different from the fabrication process used to make an integrated electronic circuit. The design details will be different, the functionality is different and the process steps used in the fabrication process sequence will be very different.

As a result of the customization of microfluidic components, significant challenges are presented with regard to the implementation of these types of devices and systems. In general, the implementation of any micro- or nano-device (herein no distinction is made between devices at the microscale of the nano-scale due to the dimensions of the devices or the dimensions of the devices critical features, and therefore the term "microfluidic devices and systems" will be deemed to apply to any device or system at either the microscale or the nanoscale) has been a very challenging endeavor.

There are a number of reasons that make implementation of microfluidic devices and systems very challenging. First, the flow resistances in micro- or nano-dimensional flow channels, opening, ports, etc. are very high. Therefore, the pressures required to obtain reasonable flow rates tend to be very high. Second, semiconductor fabrication tends to relatively high compared to what are considered reasonable costs and pricing levels for most microfluidic devices and systems. This problem is made more difficult when considered in the context of the flow resistances mentioned above. In order to reduce the flow resistance, the channels must be made larger and this makes the die sizes large and the cost high. Third, the development costs using semiconductor-based fabrication methods tends to be lengthy and expensive. Additionally, many microfluidic devices and systems have relatively small market sizes and therefore makes it difficult to get a return on the investment made in developing a microfluidic device or system. Fourth, using semiconductor-based fabrication does not lend to being flexible to make design changes.

These challenges associated with implementation of microfluidic devices or systems have represented an enormous barrier to the commercialization of these types of devices and systems. The present invention is directed at a solution to these and other challenges of implementation of microfluidic devices and systems.

SUMMARY OF INVENTION

Examples of the present disclosure are directed to novel and low-cost microfluidic devices and systems and the method of manufacturing. Example embodiments enable the implementation of any type of microfluidic device including: microvalves; micropumps; mixers; chemical reaction chambers; check valves; pressure sensors; flow sensors; temperature sensors; chemical sensors; biological sensors; flow resistors; flow integrators; shear stress sensors; material property sensors; magnetic sensors; electromagnetic sensors; thermal sensors; hall effect sensors; as well as any device that can be implemented using semiconductor fabrication techniques. Examples of the present disclosure also readily allows for the merging of microfluidic devices and systems with integrated electronics and photonic circuits; as well as active electronic and photonic devices such as transistors; diodes; photodiodes; photodetectors; emitters; as well as any device that can be implemented using semiconductor fabrication techniques. Examples of the present disclosure also readily allows for the integration of passive components having pre-determined values of resistance, capacitance and inductance. Some of the enormous benefits of the current disclosure include: the design and manufacturing can be easily customized for most any microfluidic application or product; the development time and cost are low for new design implementations; and the manufacturing cost is very low (as little as a few cents per square inch).

BRIEF DESCRIPTION OF THE DRAWINGS

FIGS. 3A through 3F are illustrations of the low temperature co-fired ceramic (LTCC) process including the formation of enclosures of device die.

FIGS. 9A through 9D is a highlight of the fabrication process for the micropump shown in FIGS. 8A through 8C.

FIG. 14 illustrates a method for fabrication of a microfluidic device or system according to another embodiment of the present technology.

FIG. 15 illustrates a method for fabrication of a microfluidic device or system according to another embodiment of the present technology.

DETAILED DESCRIPTION OF THE INVENTION

Figure 1:
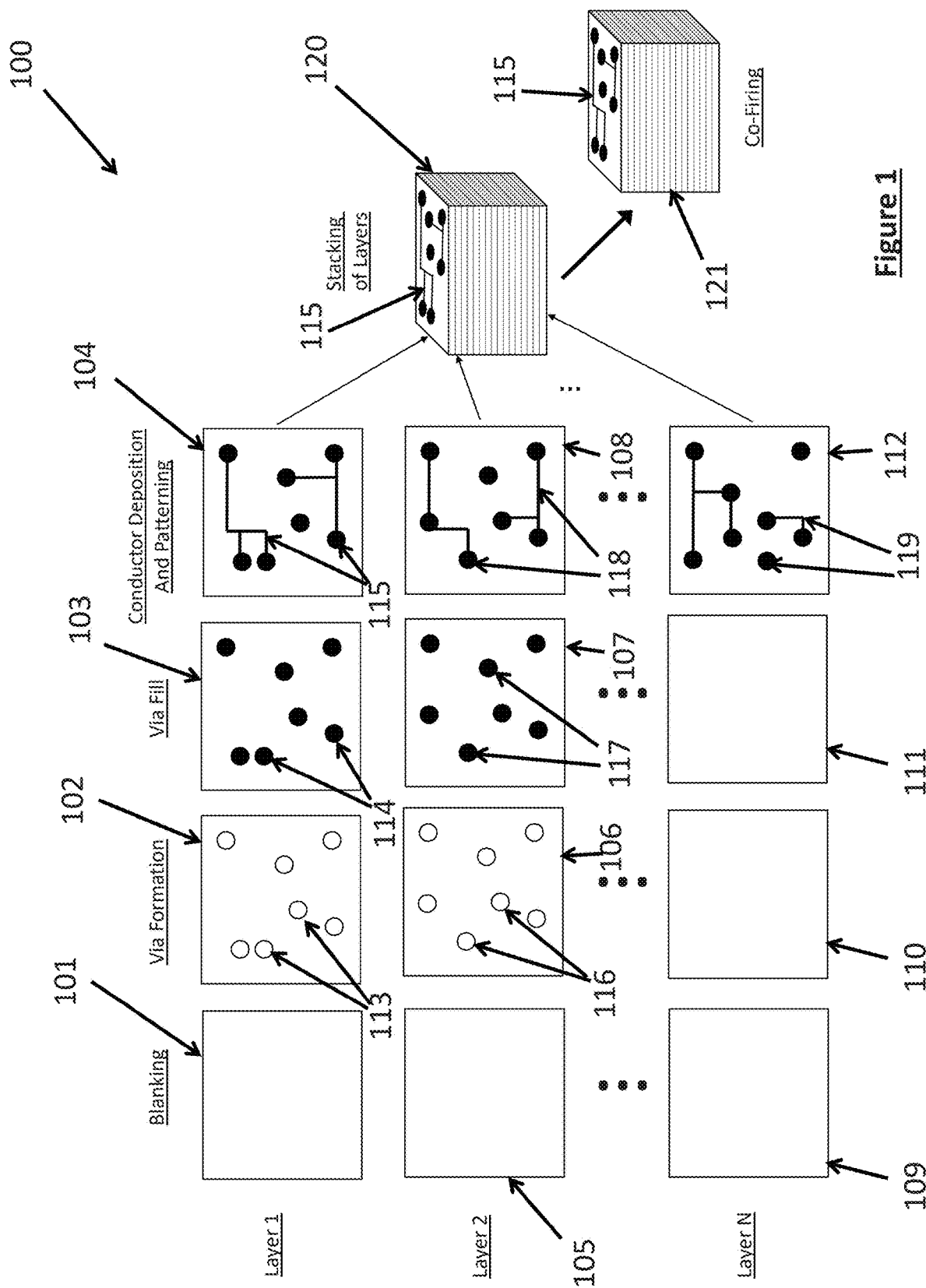
FIG. 1 is an illustration of the low temperature co-fired ceramic (LTCC) process.

Examples of the present disclosure are directed to novel and low-cost microfluidic devices and systems and the method of manufacturing. Example embodiments enable the implementation of any type of microfluidic device including: microvalves; micropumps; mixers; chemical reaction chambers; check valves; pressure sensors; flow sensors; temperature sensors; chemical sensors; biological sensors; flow resistors; flow integrators; shear stress sensors; material property sensors; magnetic sensors; electromagnetic sensors; thermal sensors; hall effect sensors; as well as any device that can be implemented using semiconductor fabrication techniques. Examples of the present disclosure also readily allows for the merging of microfluidic devices and systems with integrated electronics and photonic circuits; as well as active electronic and photonic devices such as transistors; diodes; photodiodes; photodetectors; emitters; as well as any device that can be implemented using semiconductor fabrication techniques. Examples of the present disclosure also readily allows for the integration of passive components having pre-determined values of resistance, capacitance and inductance. Some of the enormous benefits of the current invention include: the design and manufacturing can be easily customized for most any microfluidic application or product; the development time and cost are low for new design implementations; and the manufacturing cost is very low (as little as a few cents per square inch).

Examples of the present disclosure are based on the use of low-temperature co-fired ceramic (LTCC) technology for the implementation of microfluidic devices and systems. The basic concept of LTCC is that highly complex and functional structures can be implemented from the stacking of thin layers individually processed and patterned layers of a malleable ceramic material layer called "green tape", followed by the aligned stacking of these individual processed and patterned layers, and then firing (i.e., exposing to an elevated temperature for a pre-determined period of time and temperature) the stacked ensemble of layers to transition the green tape to a hard ceramic material thereby forming the composite structure containing passive components, pathways, electrical connections, through-layer openings or vias, through-layer electrically conductive vias, and mounted active devices, and various interfaces on the surfaces for electrical and other means of connectivity to the internally encapsulated elements.

The individual layers are composed of a material called "green tape" that lends itself to easy to a diverse set of processing and patterning methods. The green tape layers are composed of a material that once fired has excellent performance properties, including stability, reliability, a thermal expansion coefficient nearly equal to silicon, low microwave electromagnetic loss factors, non-permeable to liquids and most gases, long-term stability, good thermal properties, good electrical insulation properties, and more.

Green tape has a uniform thickness and can be cut into any shape and size, and patterned before firing. Through-layer holes or other pre-determined shapes can easily be made in the green tape. These through-layer openings can be used to make fluid flow channels in the horizontal directions as well as in the vertical direction in the stacked ensembles. Through-layer holes can also be filled with a conductive material to make thought-layer electrical via connections. The surface of the green tape can be processed by screen-printing pre-defined patterned layers of conductive materials such as gold, copper, silver, etc. to form electrical connections and electrical passive components, such as resistors, capacitors and inductors, as well as areas for the surface mounting of active elements.

After firing, the composite layers can be further processed, including the mounting of active devices (e.g., electrical active devices including diodes, transistors, LEDs, etc; MEMS devices, such as inertial sensors, pressure and force sensors, actuators, etc.; and microfluidic devices and systems such as microvalves, micropumps, etc). Typically, these active devices would be implemented onto substrates such as silicon, glass, or some type of semiconductor material and then mounted onto the LTCC using a conductive paste or a thermo-compression bonding method.

The fired LTCC material can also be machined, such as drilling holes or making of fluid channels. The fired LTCC can be polished to a low level of surface roughness and then processed to make active devices directly onto the surfaces of the material such as micromechanical elements including switches and valve elements. The fired LTCC can be made into standard substrate sizes and processed using standard semiconductor fabrication equipment such as thin-film layer depositions, photolithography, and etching.

Moreover, the after stacked layers of fired LTCC have been processed, such as the mounting of active elements onto the surfaces, separate pieces of the fired and processed LTCC can be bonded together using thermo-compression bonding methods to encapsulate the active elements as well as make fluidic containing pathways through the structure.

The use of LTCC with the wide array of processing and patterning techniques available make it an extremely adaptable, flexible, rapidly developed, and low-cost solution for packaging.

An advantage of the LTCC technology is the ability of stacking multiple dielectric layers, wherein each layer can have individually patterned metallic circuits formed on the surfaces, which can then be placed on top of one another and with high quality interlayer connections, so as to form 3-Dimensional circuit implementations. The metallic conductors on the various layers of LTCC can be interconnected using metallic filled vias with considerable ease. Interlayer vias made in LTCC display excellent electrical conductivity. LTCC technology enables fifty (50) or more individual layers of LTCC material, each of which can have a unique circuit fabricated on the surface, to be stacked up and fired together to embody extremely complex 3-D circuits. In some examples, groups of the one or more groups of layers can be aligned and bonded to form micro-mechanical device and/or micro-electro-mechanical device types includes: microvalves; micropumps; mixers; chemical reaction chambers; check valves; pressure sensors; flow sensors; temperature sensors; chemical sensors; biological sensors; flow restrictors; flow integrators; shear stress sensors; material property sensors; magnetic sensors; electromagnetic sensors; thermal sensors; hall effect sensors; as well as any device that can be implemented using LTCC, and micromechanical and micro-electro-mechanical fabrication techniques.

Some examples of the present technology provide a microfluidic device or system made from LTCC combined with a semiconductor device die, wherein the device die can be one or more MEMS microfluidic devices and/or electronics and the LTCC has flow channels, chambers and inlet and outlet ports. In some examples, the microfluidic device or system may not include active elements for microfluidics made from LTCC.

Some examples of the present technology provide a microfluidic device or system where there are semiconductor devices (e.g., microfluidic and/or electronics) combined with LTCC passive and active devices. In this example, the "active LTCC" may be included as an additional element comprising a microfluidic device or system made from LTCC combined with a semiconductor device die.

Some examples of the present technology provide a microfluidic device or system made from LTCC wherein there are microfluidic non-active devices made from LTCC (e.g., wherein the example is a flow restrictor); and include an additional element comprising a microfluidic device or system made from LTCC combined with a semiconductor device die.

Some examples of the present technology provide a microfluidic device or system wherein all of the microfluidics elements are made from LTCC and they can be passive and/or active elements.

FIG. 1 illustrates the processing method embodiment 100 of LTCC to construct composite ceramic modules 120 containing multilayer stacks of circuits. The LTCC green tape is first cut into blanks 101, 105, . . . 109 using a process called blanking (Note: only the series of processing steps for three blanks are directly illustrated in FIG. 1, but the symbol " . . . " is used to indicate that there may be more than three blanks involved in the processing of the blanks, and in fact, there may be tens of blanks involved in the processing of the blanks). Each of the individual N blank layers can be processed and patterned differently.

Typically, the different blank layers will have the same thickness, shape and size, although different thicknesses shapes and sizes can be accommodated as well in LTCC processing. Next, patterns of opening or via features 113 and 116 are made into these blank layers 102 and 106 to form openings or vias according to a pre-determined pattern. These opening or via features 113 and 116 are made completely through the blank layer 102 and 106 thicknesses and the features 113 and 116 from one blank layer 102 and 106 to another may differ. These opening or via features 113 and 116 can be in many sizes and shapes.

Subsequently, some pre-determined pattern of the opening or via features 113 and 116 are filled (e.g., see filed vias 114 and 117) with a metallic electrical conductive material, usually a gold, silver or copper paste. Next, a pre-determined pattern of electrically conductive interconnects 115, 118, and . . . 119 are screen-printed onto the surfaces of the blanks 104, 108 and . . . 112. The pattern of these electrical interconnects 115, 118, and . . . 119 may differ from one blank 104, 108, and . . . 112 to another. As noted in FIG. 1, each processed blank 104, 108 and, . . . 112 may have a different pattern of filled vias 114, and 117 and electrical interconnects 115, 118, and . . . 119. The processed blanks 104, 108, and . . . 112 are then aligned and stacked or laminated together to form a composite element or module 120 of LTCC green tape.

If the processed blanks are composed of individual elements, the blanks may be green cut. This is typically a partial cutting process that does not extend through the thickness of the blank. Green cutting is not shown in FIG. 1.

Lastly, the stacked or laminated blanks forming a composite module 120 are then co-fired into a composite module 121. The co-firing is an elevated temperature exposure of the stacked or laminated blanks (e.g., composite module 120) that results in a curing of the blanks wherein the green tape transitions from a malleable material to a harden ceramic material. Additionally, the co-firing results in the filled vias 114, 117, . . . to make good electrical connections to the vias 114, 117, . . . in other blanks and to make good electrical connection from the vias 114, 117, . . . to the patterned conductive interconnects 115, 118, and . . . 119 printed onto the surfaces of the blank 104, 108, and . . . 112 when these elements align to one another in the stacked layers.

The co-fired element 121 may then be separated into the individual smaller elements using a process called singulation. Alternatively, the co-fired blanks may be sawed into individual smaller elements. Alternatively, the processed ceramic modules 121 can be used as is.

With the completed co-fired ceramic module 121, various passive and active electrical components can then be made into or mounted onto the surface(s) of the composite module 121. This may include integrated circuits, both unpackaged as well as in surface mount packages, as well as discrete devices. This will be described in more detail below. Typically, the co-fired composite module 121 will have areas of patterned electrically conductive 115 material on the surface that are used to make electrical contact between the elements on the co-fired ceramic module 121 and outside components and/or circuits.

Figure 2:
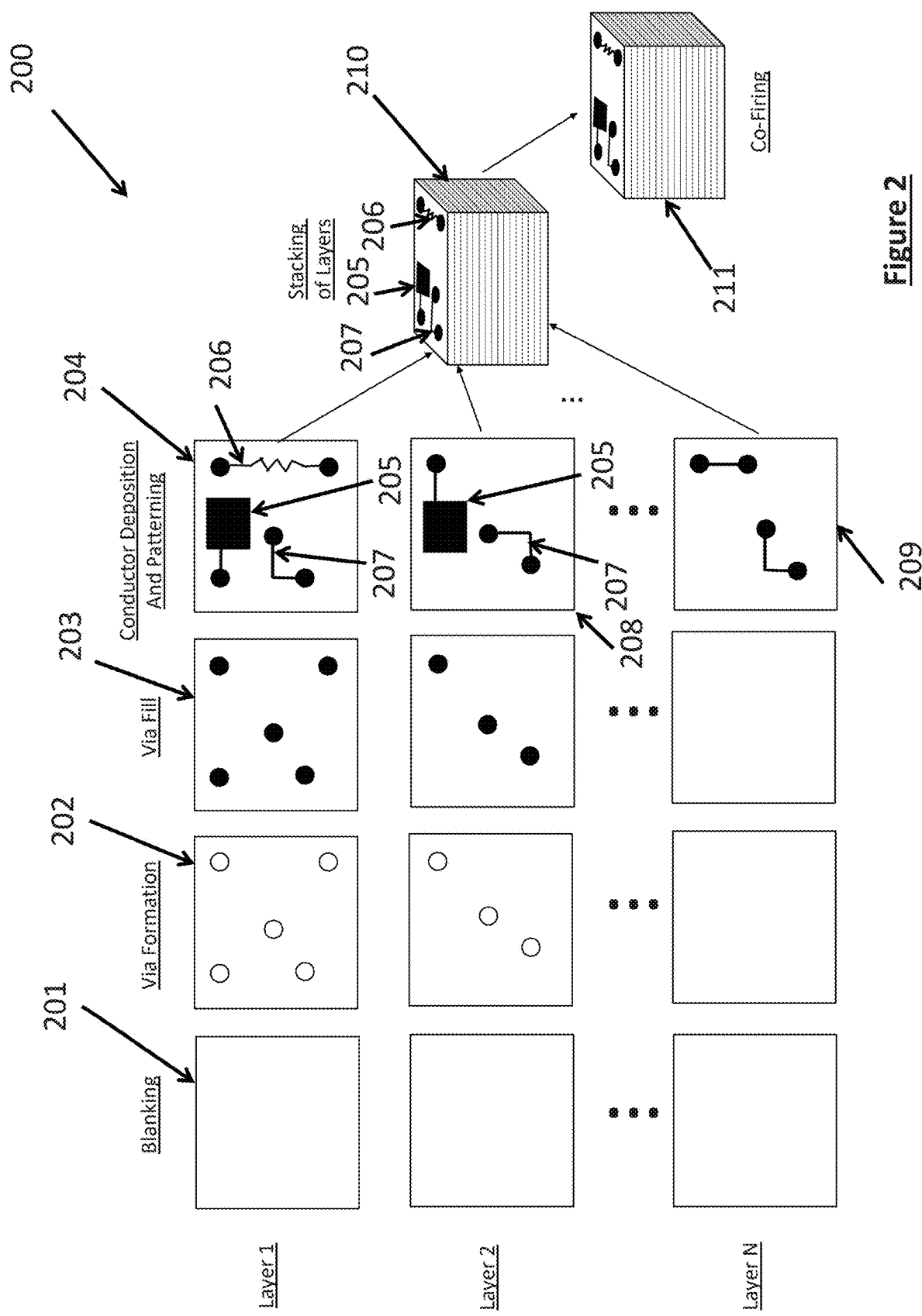
FIG. 2 is an illustration of the low temperature co-fired ceramic (LTCC) process including the formation of passive components such as resistors, capacitors and inductors.

Through the use of the electrically-conductive filled vias and deposited and patterned electrically-conductive metal interconnects, a number of passive electrical components may be implemented such as resistors, capacitors, and inductors as shown in FIG. 2.

In some examples, semiconductor devices may be bonded to pre-determined surfaces of one or more LTCC layers of a plurality of LTCC layers. In some example, the semiconductor device type may include one or more of the following: op-amps; resistors; capacitors; microvalves; micropumps; mixers; chemical reaction chambers; check valves; pressure sensors; flow sensors; temperature sensors; chemical sensors; biological sensors; flow resistors; flow integrators; shear stress sensors; material property sensors; magnetic sensors; electromagnetic sensors; thermal sensors; hall effect sensors; integrated electronics and photonic circuits; as well as active electronic and photonic devices such as transistors; diodes; photodiodes; photodetectors; photoemitters; as well as any device that can be implemented using semiconductor fabrication techniques. The semiconductor device may be provided in a chamber formed by a plurality of plurality of LTCC layers.

As seen in FIG. 2, there are some pre-determined number of green tape blank layers 201 wherein each of N layers may be individually processed and patterned as described above. The blank element 201 has openings or vias made into it of a pre-determined pattern as shown in blank 202. As before, there a N blank layers each of which can be individually processed and patterned. The patterned blank 202 then has a pre-determined pattern of openings or vias filled to form the further processed blank 203. Then, the further processed blank 203 has pre-determined pattern of passive electrical components screen-printed onto the surface of the blank 204. These can include passive electrical components such as resistors 206, inductors 207 and capacitors 205. The formation of the capacitors 205 and inductors 207 are shown implemented onto multiple layers of blanks 204, 208, and . . . 209. The individual processed blanks 204, 208, and . . . 209 are then aligned and stacked or laminated together 210. The stacked blanks 210 are then co-fired at an elevated temperature to transition the stacked layers of green tape into a ceramic composite element 211.

Figure 3A:
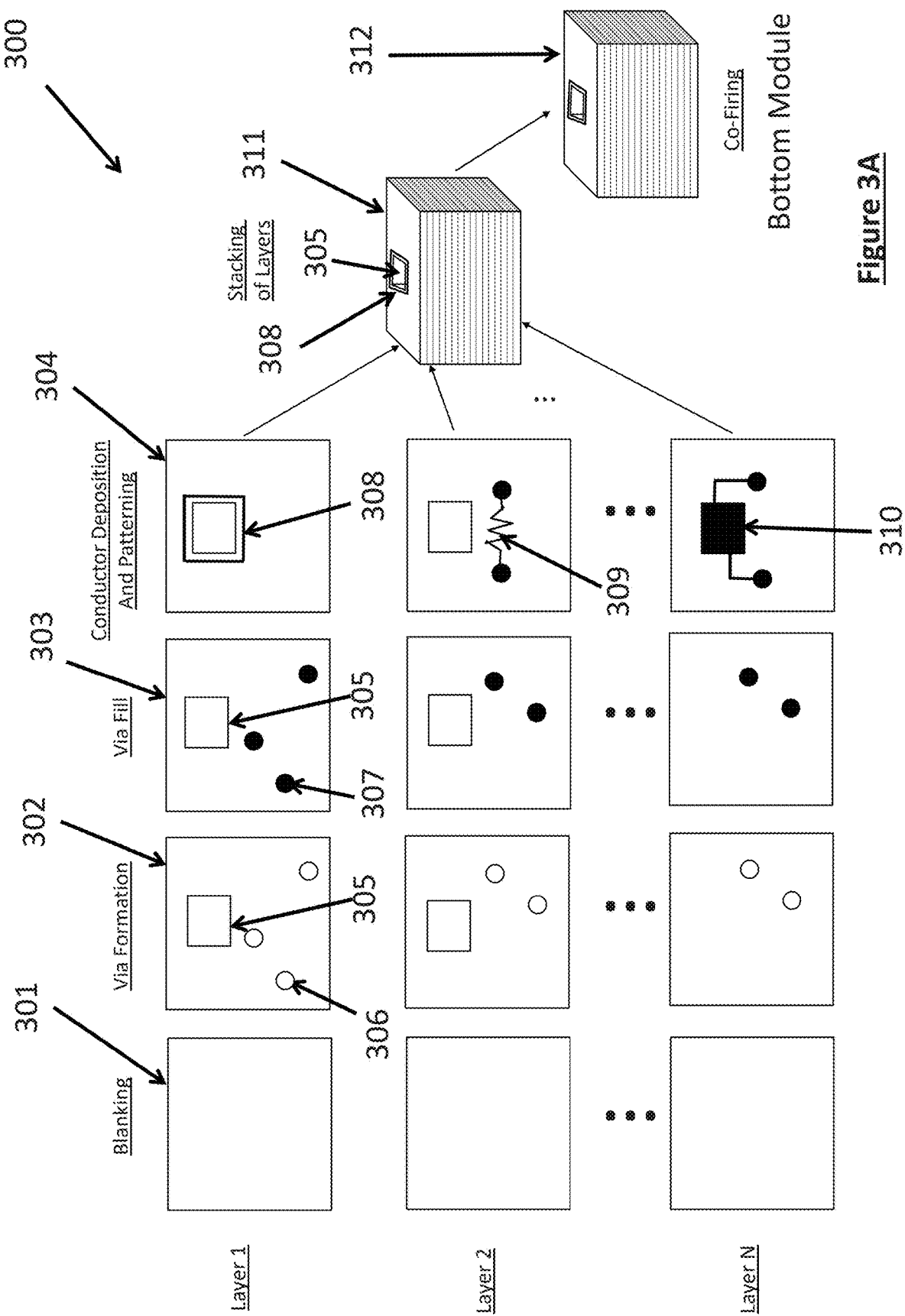
Figure 3B:
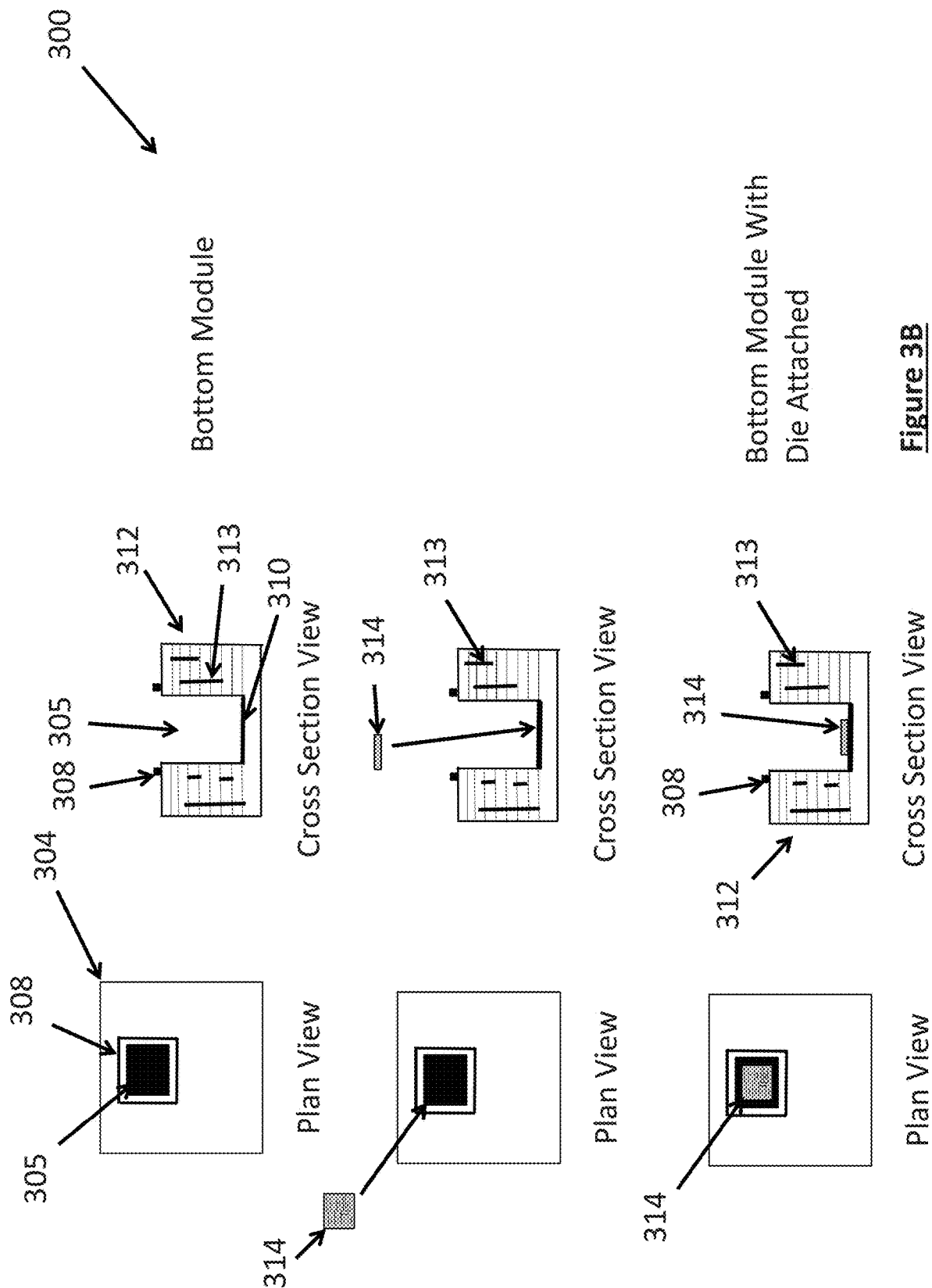

LTCC is useful for the formation of enclosed channels by bonding LTCC modules together as well as the encapsulation of device dies 300 made using micro- or nano-fabrication techniques s shown in FIGS. 3A and 3B.

As shown in FIG. 3A, there are some pre-determined number of green tape blank layers 301 wherein each of N layers may be individually processed and patterned as described above. The green tape blank layers 301 have a pre-determined pattern of openings or vias 305 and 306 formed in them and some pre-determined number of them are not filled with an electrically conductive material resulting in open areas 305 and filled vias 307 in the blank layers 301. During the screen-printing, a metal ring 308 is formed around the perimeter of the open unfilled via 305 that will be used for bonding. Passive electrical components 309 including resistors and a metal bond pad 310 for die can be made in the blank layers according to a pre-determined design configuration using the methods described above. Capacitors and inductors are not shown in FIG. 3A, but can be made in the blank layers as described above. The blank layers are then aligned and stacked or laminated to form an LTCC green tape composite element 311 with the passive elements 309 and 310 contained within the composite element 311 and the metal bonding ring 308 on the top surface of the composite element 311. The composite element 311 is then exposed to an elevated temperature to co-fire the composite element 311 to transition the composite element 311 from a green tape to a ceramic composite element 312 thereby forming the bottom module 312. The bottom module 312 contains pre-determined electrical wiring (e.g., including filled vias 307) incorporated into the layers as well as any pre-determined passive components 309 according the pre-determined design configuration.

Next, as shown in FIG. 3B in both plan view and cross sectional view, the bottom module 312 with the electrical bond pad 310 exposed through the unfilled vias 305 through the LTCC layers 304 has a die 314 containing micro- or nano-fabrication devices including active elements is bonded to the bonding pad 310 in the bottom module 312 thereby resulting in the bottom module 312 with the die 314 attached as shown at the bottom of FIG. 3B. The bonding can be done with an electrically conductive paste, thermo-compression bonding or similar.

Figure 3C:
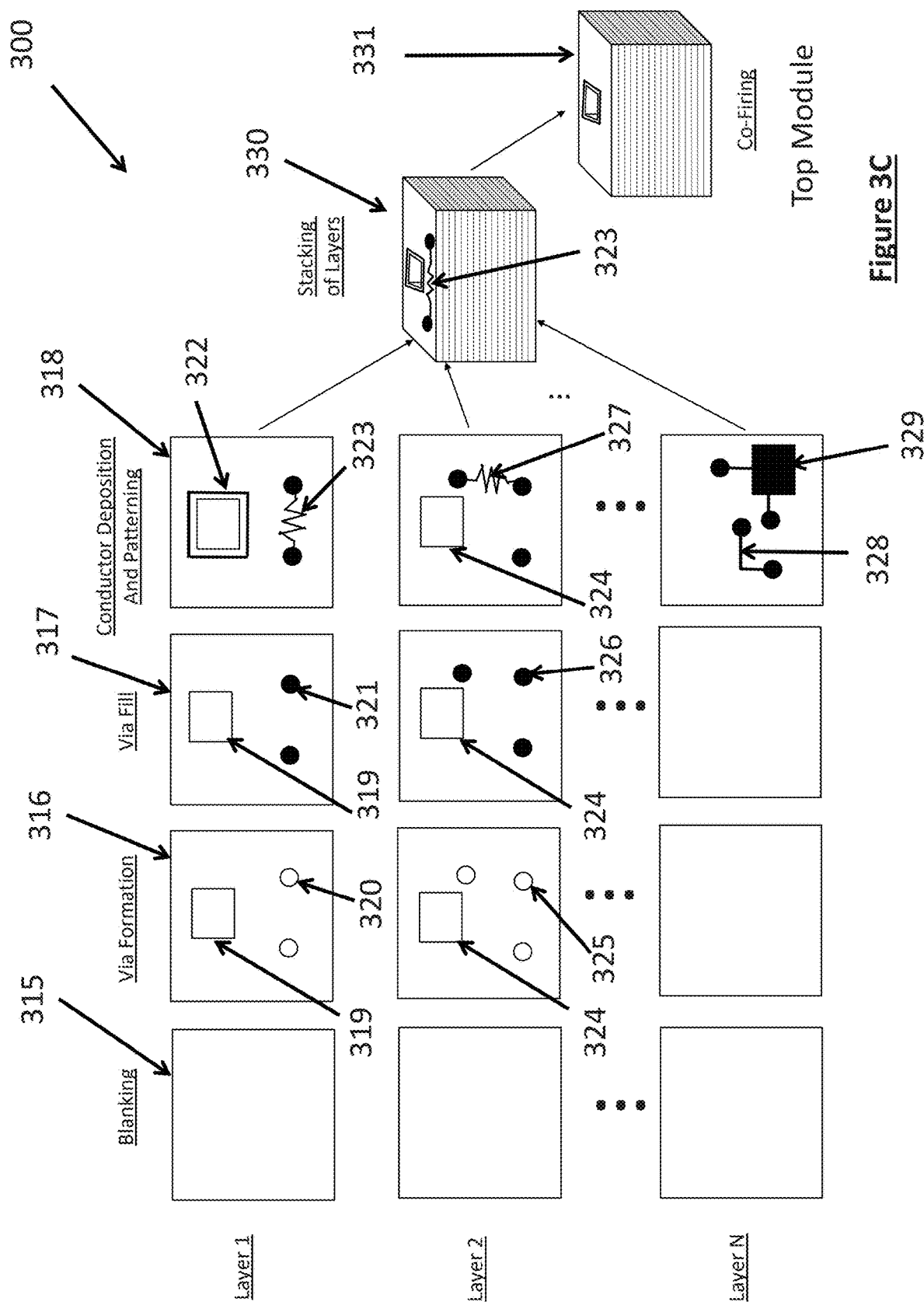

Atop module 331 is implemented as shown in FIG. 3C. As before, the blank 315 green tape layers are patterned into pre-determined features of vias 319 and 320 resulting in patterned blank layers 316. Some pre-determined number of the patterned blank layer 316 openings or vias 320 are then filled with an electrically conductive material according to a pre-determined pattern 321 wherein some of the other openings or vias 319 may not be filled. Then, screen-printing of electrical features 323, 327, 328 and 329 are made on the top surfaces of the processed and patterned blank layers 318. These electrical features can include a bonding ring 322 as well as filled vias for electrical interconnects, and passive electrical components such as resistors 323 and 327, capacitors 329 and inductors 328. The N-number of individually processed green tape blank layers 318 are then aligned and stacked or laminated to form a composite element 330. Subsequently, the processed green tape composite element 330 is exposed to an elevated temperature to transition the green tape to a ceramic resulting in a ceramic composite element 331 thereby resulting in the top module 331.

The top module 331 is shown in plan view and cross sectional view in FIG. 3D. As seen, it has an unfilled opening or via 319, various filled vias 332 that are electrically conductive, a bonding ring 322 around the perimeter of the unfilled opening or via 319 and passive components 323 and lateral electrical interconnection wiring (not shown in FIG. 3D) within the composite top module 331.

The top 331 and bottom 312 modules are then aligned (see cross sectional view FIG. 3E) and bonded together. The bonding ring 322 made on the surface of the top module 331 is aligned to physically contact with bonding ring 308 on the surface of the bottom module 312. A force or pressure loading and elevated temperature are applied to the physically contacted modules 312 and 331 to result in high-strength bonding between the modules 312 and 331 to form the bonded module 340 as shown in cross-sectional view in FIG. 3F.

As can be seen in the cross-sectional view of FIG. 3F, the die is completely encapsulated in the interior of a sealed cavity 341 within the two bonded modules 312 and 331 while the die is electrically connected to the outside of the packaging module using internal electrical interconnections 313 and 332. The environment inside the cavity 341 is hermetically sealed and can be controlled depending on the ambient used during the bonding process. For example, by bonding the two modules 312 and 331 together while in a vacuum environment will allow the cavity 341 to be evacuated. Similarly, the bonding can be performed in an inert gas environment, such as nitrogen or argon, a lower or higher pressure environment, etc. depending on the requirements for the packaging of the micro- or nano-fabricated die 314.

A unique feature of LTCC technology is the availability of different ceramic materials. Ceramic green tapes are available with various thicknesses, loss tangents, dielectric constants, thermal expansions, and magnetic properties as well as dozens of metallization options including Au, Ag and their various alloys with Pt and Pd. As a result, LTCC material systems and material choices are much broader than most alternative material systems. LTCC material systems with dielectric constants ranging from 8 to over 80 are available.

Importantly, LTCC also has large cost advantages compared to other packaging methods. Current rule-of-thumb cost estimates are a few cents per square inch per layer with the cost decreasing each year as the technology matures and productive quantities increase. Consequently, LTCC not only provides exceptional performance and extremely high levels of functionality (more than 50 stacked and interconnected layers), but also vastly lower costs compared to other technologies that are currently available.

An embodiment 400 of the present invention for the packaging of microfluidic devices and systems using LTCC is shown in cross section in FIG. 4.

Figure 4A:
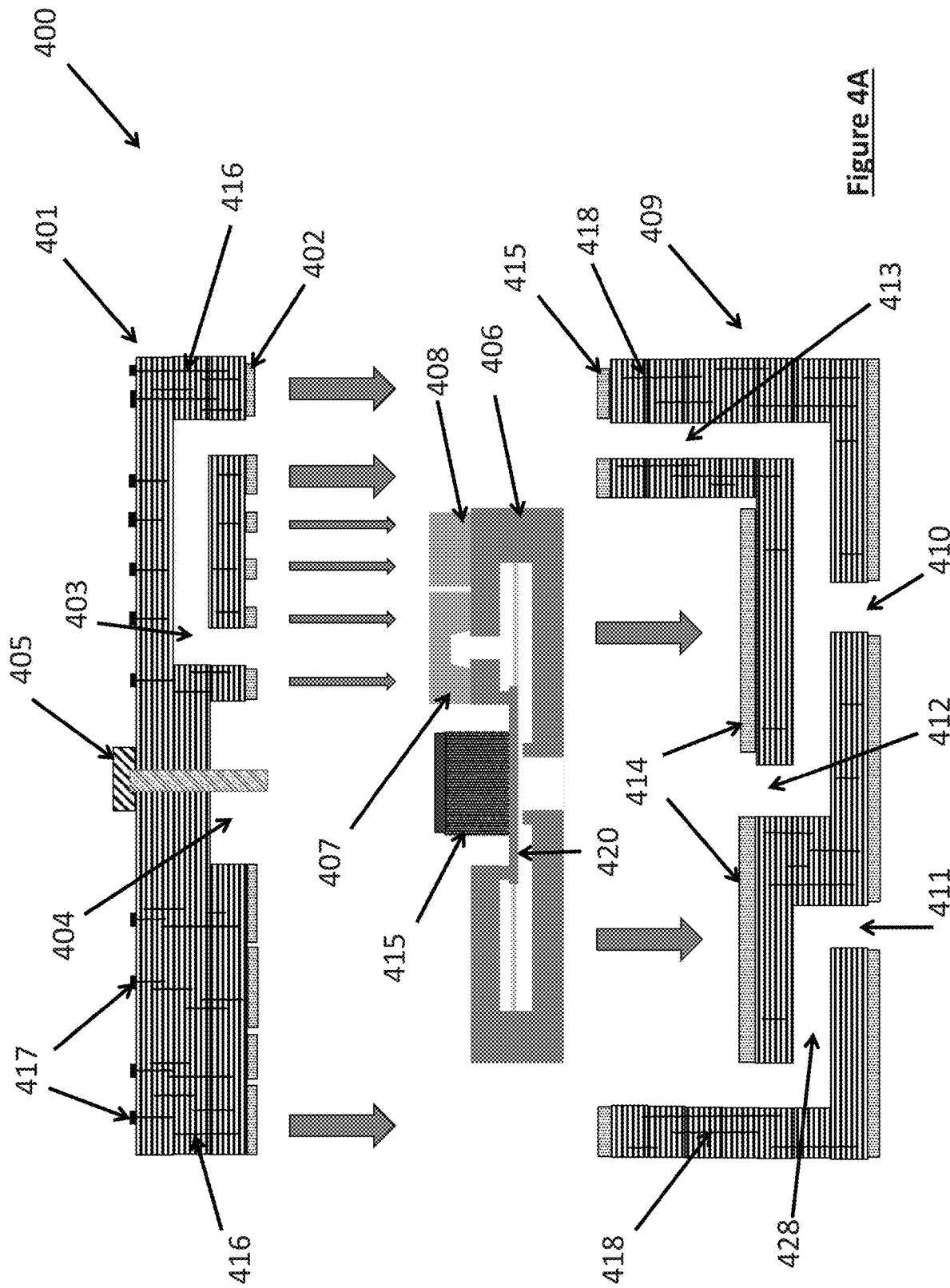
FIGS. 4A through 4D are illustrations of the low temperature co-fired ceramic (LTCC) process for the a microfluidic system composed of a semiconductor based microvalve and pressure sensor with LTCC layers.

A top module 401 composed of LTCC is shown in the top of FIG. 4A. It is made using the processing and patterning of individual LTCC blank layers as described above to form microfluidic openings or cavities 404, microfluidic channels 403, electrical contact pads 417 on the top surface of the module 401, and electrical connections 416 both in the vertical and horizontal directions throughout the layers of the module 401. Additionally, materials 402 for bonding one module 401 to another have been deposited and patterned. In some examples of the present technology, vertical and horizontal electrical interconnections through LTCC layers of the plurality of LTCC layers to make electrical connections to the semiconductor device for supplying power, connect microfluidic components of the same or different semiconductor devices to one another, and provide for electrical signals to be transferred to and/or between the semiconductor devices, and/or to the outside of the microfluidic device.

A microfabricated device 406 is also shown in the middle of FIG. 4A. This microfabricated device 406 is a three-way microvalve. It uses a piezoelectric actuator 415 to open and close the microvalve 406. The microvalve 406 top fluidic port has a pressure sensor 407 bonded over it to measure the fluidic pressure. A microfabricated electrical circuit die 408 is also bonded to the top surface of the microvalve 406 and is used to operate and control this integrated microfluidic system 406 and 407.

A bottom module 409 for the packaging of the integrated microfluidic system 406 and 408 is also shown at the bottom of FIG. 4A. The bottom module 409 is made of LTCC layers as described previously and includes: microfluidic channels 413 and 428; microfluidic ports 410 and 411; an opening 412 where the microfluidic channel 413 connects to a microfluidic port on the bottom of the microvalve 406; bonding surfaces 414 for the bonding of the integrated microfluidic system composed of the microvalve 406, pressure sensor 407 and electronics die 408, to the bottom module 409; bonding surfaces 415 for the bonding of the top 401 and bottom 409 modules; and electrical interconnections 418 in both the vertical and horizontal directions in the LTCC layers of the bottom module 409.

Figure 4B:
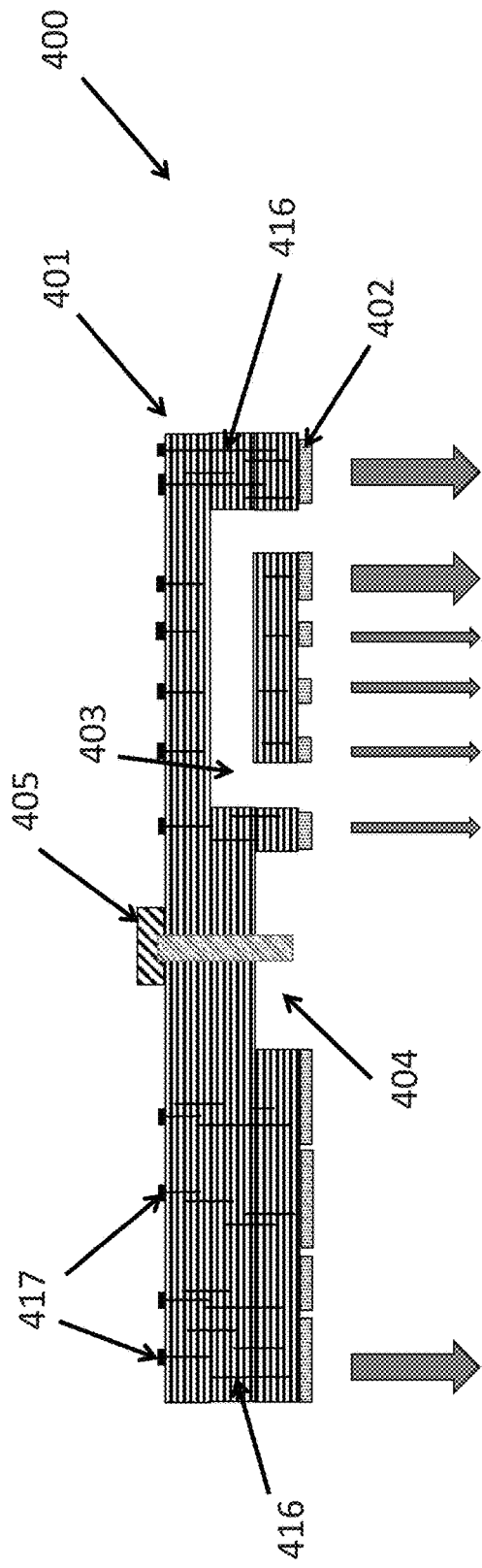
Figure 4B:
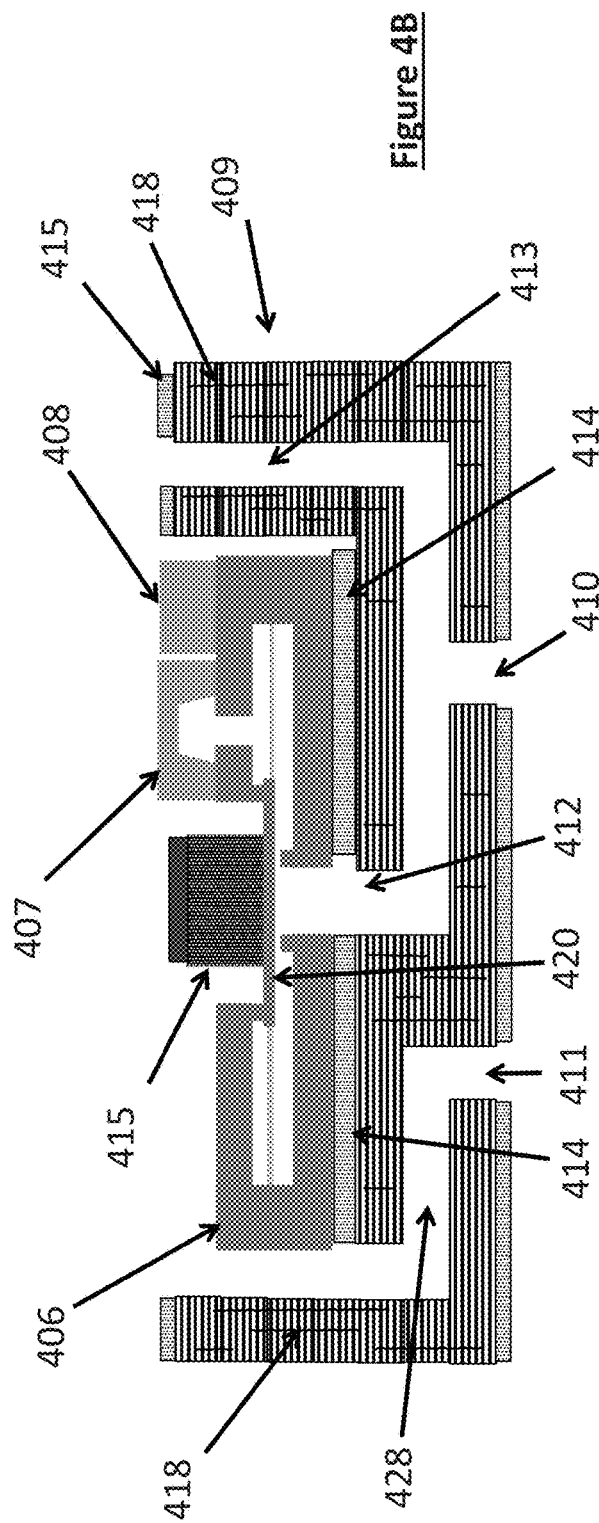

As shown in FIG. 4B, the integrated microfluidic system composed of the microvalve 406 and pressure sensor 407 and electronics die 408 is bonded to the bottom LTCC module 409 using the bonding material surface 414 made in the bottom module 409 insert. This bonding material can be a conductive paste, a thermo-compression bonding, or an epoxy or similar. If an electrically conductive material layer 414 is used for the bonding of the integrated microfluidic system composed of the microvalve 406 and pressure sensor 407 and electronics die 408, then the electrically conductive interconnects 418 made vertically and horizontally in the bottom module 409 can be used to electrically connect to the microfluidic system composed of the microvalve 406 and pressure sensor 407 and electronics die 408.

Figure 4C:
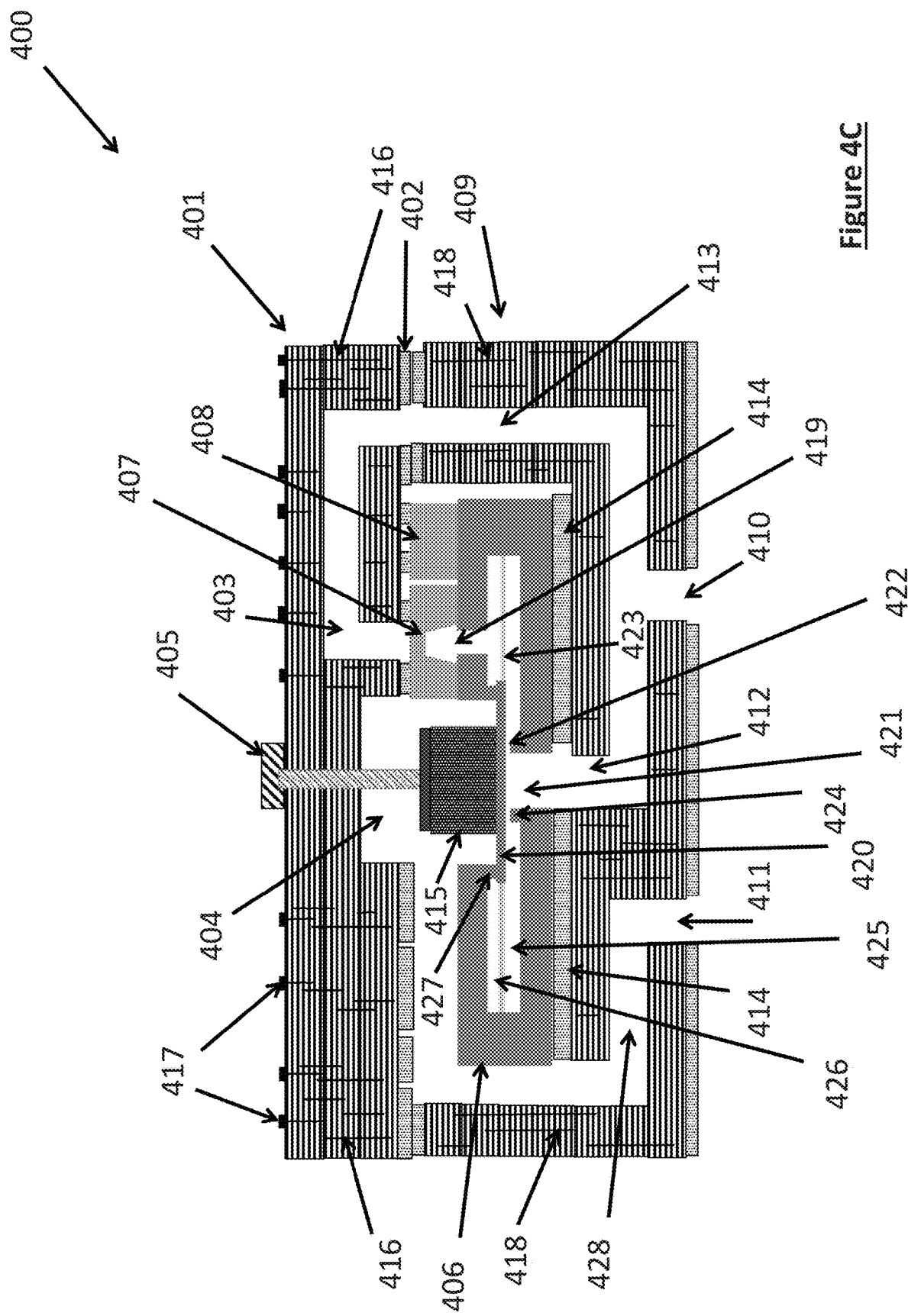

Next, as shown in FIG. 4C, the top module 401 is bonded to the bottom module 409. Depending on the nature of the microfluidic system, bonding may also be performed to one or more pre-determined elements of the microfluidic system, such as the microvalve 406, the pressure sensor 407 and the electronics die 408. In the case of FIG. 4C, bonding is done to the pressure sensor 407 and the electronics die 408 in order to make electrical contact to the top surfaces of these devices (e.g., pressure sensor 407 and electronics die 408) where electrical bond pads are located. In some other microfluidic system configurations, it may be desirable to bond to the top surface of the microvalve 406 in order to make electrical connection to the device (e.g., microvalve 406). An adjustment fine-threaded screw 405 is available in the top module 401. This screw allows adjustment so that any distance from the top of the piezoelectric actuator 415 can be removed so that the actuator has a fixed surface to work against with the actuator 415 is actuated.

The result of the bonding of the top module 401 to the bottom module 401 and one or more elements of the microfluidic system 400 composed of the microvalve 406 and pressure sensor 407 and electronics die 408, is shown in FIG. 4C, thereby resulting in a packaged integrated microfluidic system 400. Herein the microfluidic system composed of the microvalve 406 and pressure sensor 407 and electronics die 408 are discrete devices made using non-LTCC materials, specifically, silicon or other semiconductor, or a type of glass, or a ceramic or metal.

From an operational standpoint, there are two inlet ports, a first inlet port 410 and a second inlet port 411, and one outlet port 419 that is sealed against the underside of the pressure sensor 407. When the piezoelectric actuator 415 is not actuated, that is, no voltage is applied to the piezoelectric actuator 415, the actuator does not apply force against the microvalve 406 movable plunger plate 420. In this state, fluid can flow into a first inlet port 410, branch into two directions along a first and second fluid channels 412 and 413. The fluid in the second channel 413 reaches the fluid channel 403 whereupon it contacts the top surface of the pressure sensor 407 and applies the pressure of the fluid upon the top surface of the pressure sensor 407. The other pathway of the fluid in the first channel enters the bottom port 421 of the microvalve 406 and flows through the opening 422 between the top surface of the sealing ring or sealing surface 424 and the bottom of the plunger plate 420 and then through the low chamber 425 of the microvalve 406 through openings in the microvalve moveable membrane 423, then through the upper chamber 426 of the microvalve 406, and outward of the top outlet port 419 of the microvalve 406. The fluid flowing though the top outlet port 419 of the microvalve 406 reaches the underside of the pressure sensor 407 and applies the fluid pressure to that surface. Since the fluid pressures applied to the top and bottom surfaces of the pressure sensor 407 are the same, no pressure differential is measured with the integrated microfluidic system composed of a microvalve 406, pressure sensor 407 and electronics die 408, in this state. The fluid entering the second inlet port 411 flows through the channel 428 and reaches the top of the plunger plate 420 of the microvalve 406. Since the plunger plate 420 is in contact with the top sealing rings or sealing surfaces 427, no fluid can flow through the microvalve 406 in this direction.

Figure 4D:
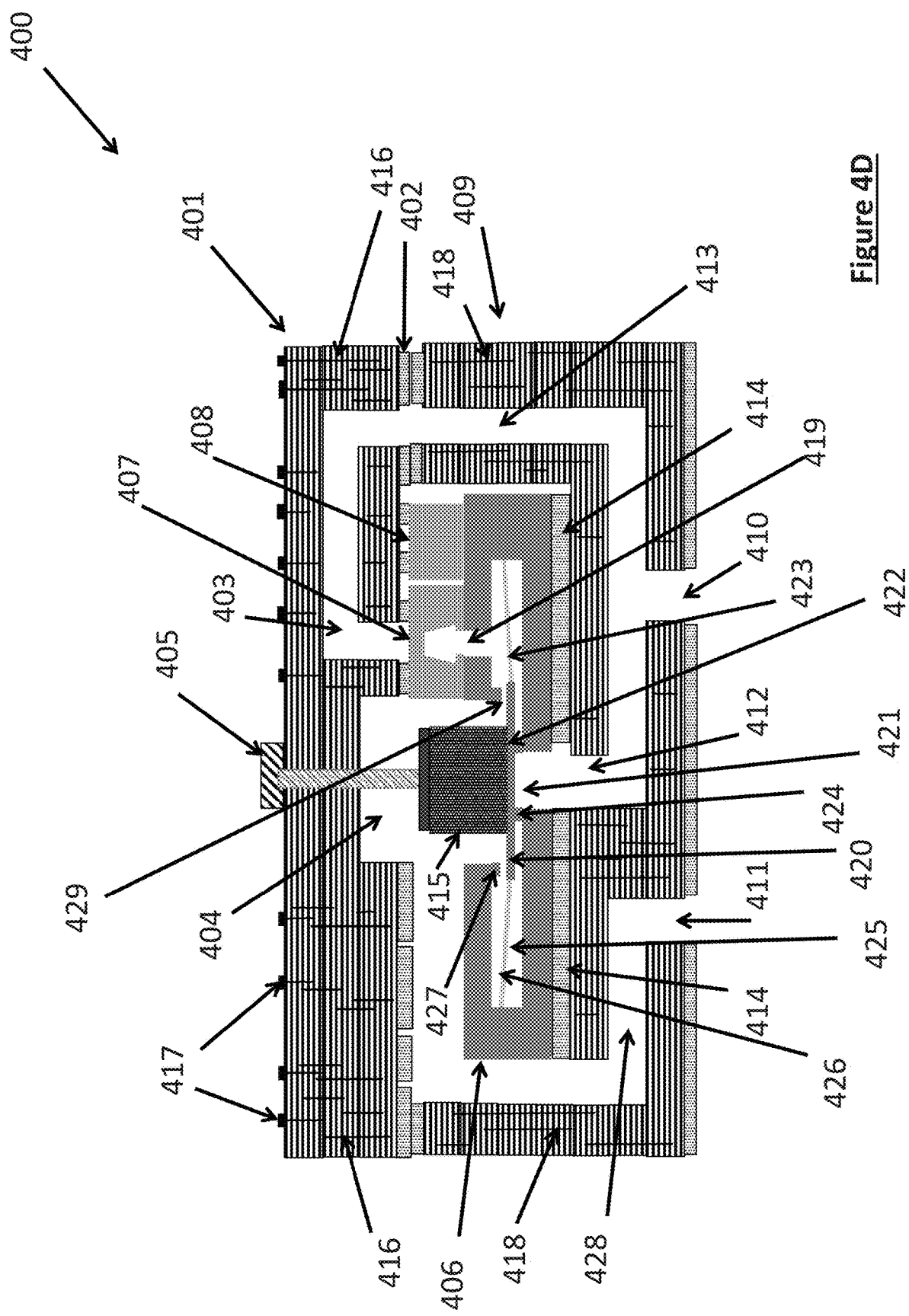

The second state of the integrated microvalve system composed of a microvalve 406, pressure sensor 407 and electronics die 408 in the package is described as shown in FIG. 4D. In the second state, a voltage is applied across the piezoelectric actuator 415 thereby causing it to elongate. When the piezoelectric actuator elongates, it applies a force to the plunger plate 420 that moves it so that the bottom of the plunger plate 420 is in contact with the top of the sealing rings or sealing surfaces 424. This closes the one of the inlet ports 421 to the microvalve 406 so that fluid cannot enter into the microvalve 406 lower chamber 425. As before, fluid enters into the first inlet port 410 of the package, flows through the channel 413 in the package, enters the channel 403 of the package whereupon it reaches the top surface of the pressure sensor 407, thereby applying the fluid pressure on the top surface of the pressure sensor 407. Fluid that enters the second inlet port 411 of the package enters flow channel 428, and reached the top of the moveable plunger plate 420 of the microvalve 406. Since the plunger plate 420 has been displaced by the piezoelectric actuator 415, it is in contact with the sealing rings or sealing surfaces 424 around microvalve port 421. Therefore, a gap 429 is created between the top of the plunger plate 420 and the sealing rings or sealing surfaces 427 thereby allowing fluid to pass through this gap 429. The fluid passing through this gap 429 enters into the top chamber 426 of the microvalve 406, and enters the outlet port 419 of the microvalve 406, and reaches the underside surface of the pressure sensor 407 thereby applying the fluid pressure to the bottom surface of the pressure sensor 407. Since the pressure sensor 407 can then measure if there is a difference in fluid pressures on either side of the pressure sensor 407 in this state.

Figure 5:
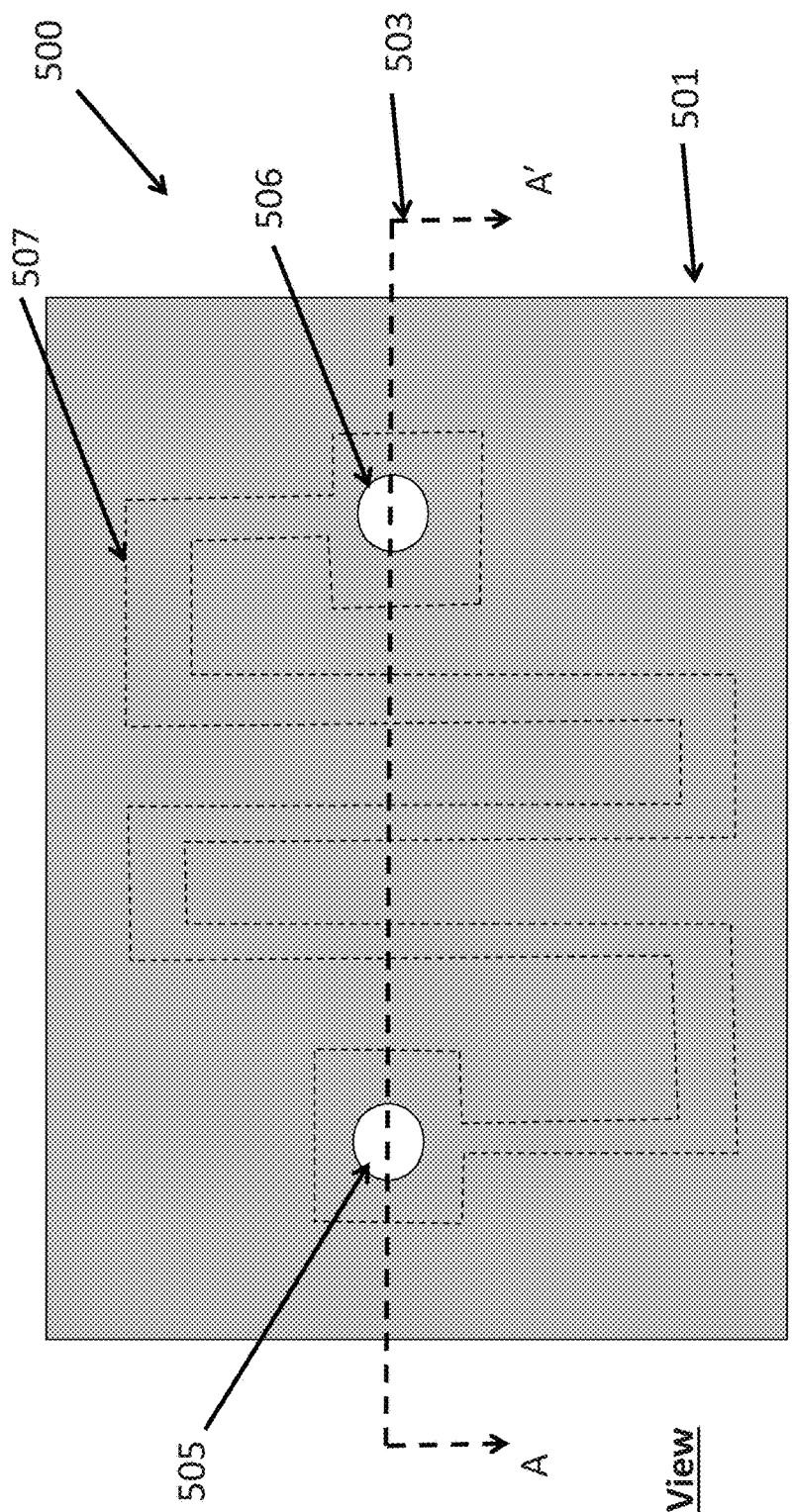
FIG. 5 is a plan view and cross section of a microfluidic flow restrictor made in LTCC.
Figure 5:
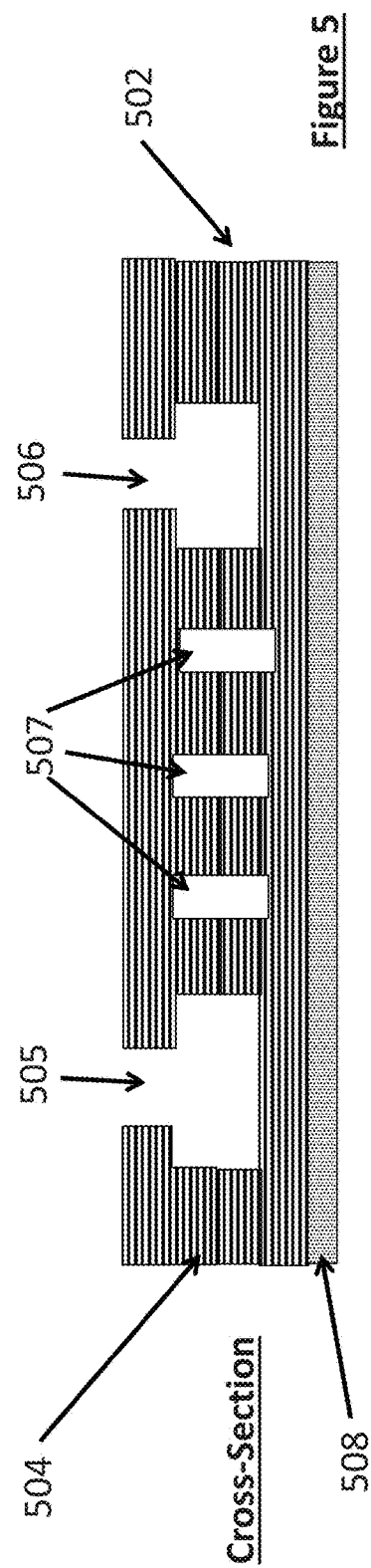

Another embodiment 500 of the present invention is shown in FIG. 5 in both plan view and cross sectional view, wherein the cross sectional view is along line AA'. A flow restrictor/flow channel device 501 is shown made of patterned layers of LTCC green tape. As described above, the LTCC green tape layers are individually patterned to make open areas that will constitute the flow channel 507, the left side fluidic port 505 and the right side fluidic port 506. The LTCC green tape layers of the composite structure 502 are aligned and stacked, and then subsequently exposed to an elevated temperature to transition the LTCC green tape into a LTCC ceramic material composite. A layer of material 508 is shown deposited on the bottom of the device 501 that is used to bond the device 501 to another surface. Importantly, the embodiment 500 in FIG. 5 completely makes a microfluidic device from LTCC.

The method of implementation of the embodiment 500 shown in FIG. 5 is straightforward based on previous descriptions. Specifically, layers 504 of LTCC green tape are patterned to remove portions of the LTCC green tape that define the flow channel 507 and fluid ports 505 and 506. The patterned layers 504 of LTCC green tape are then aligned and bonded together to form the composite structure 502. Subsequently, the composite structure 502 is exposed to an elevated temperature to co-fire and transition the LTCC green tape into a LTCC ceramic material. A material layer 508 for bonding of the flow restrictor 500 can be deposited onto the module (e.g., the composite structure 502).

Figure 6A:
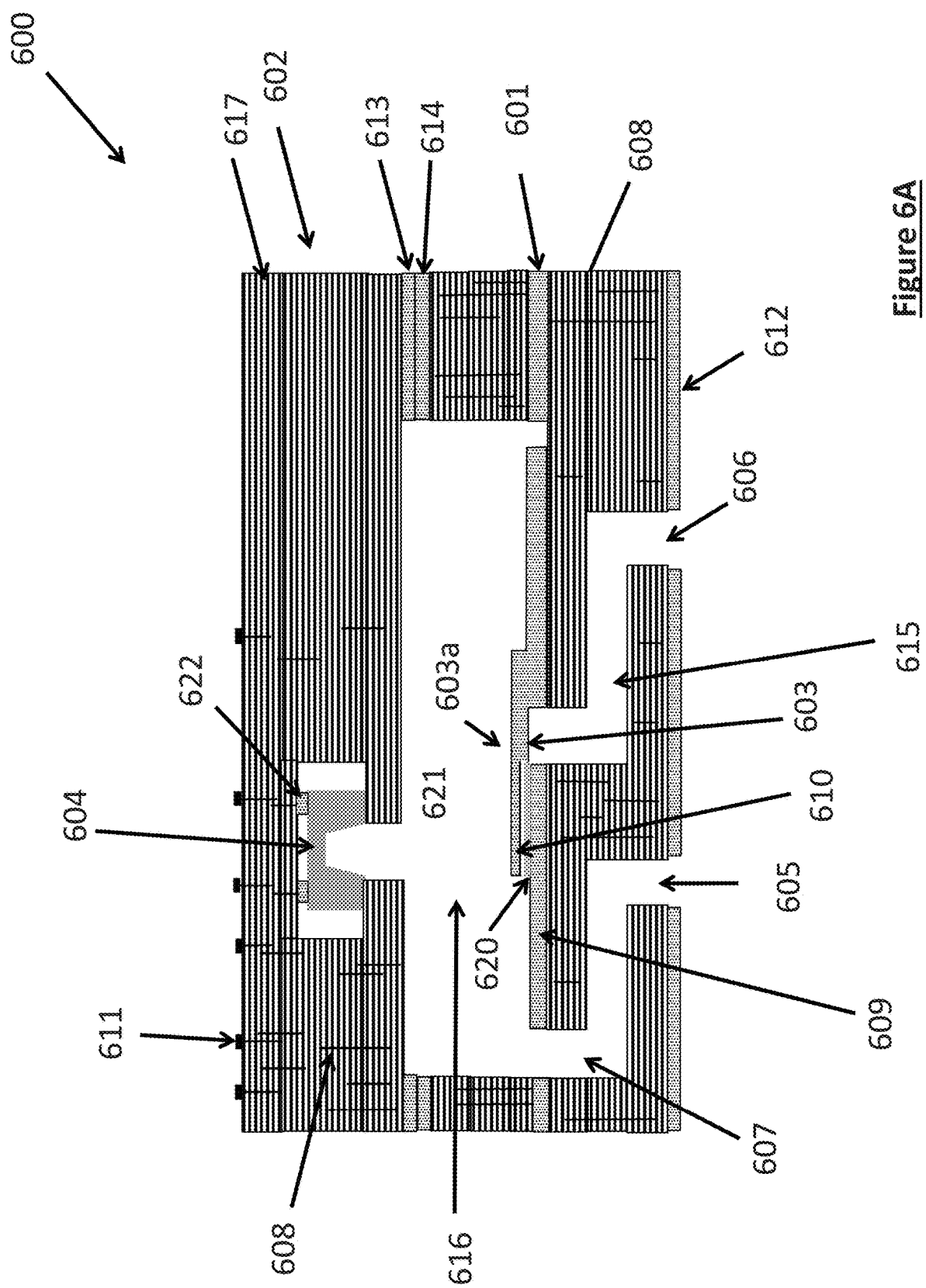
FIGS. 6A and 6B are cross sections of a microfluidic device composed of a one-way check microvalve made using LTCC combined with a semiconductor pressure sensor.

Another embodiment 600 is shown in FIG. 6A, is an integrated microfluidic system 602 composed of check microvalve 603 and a pressure sensor device 604. In contrast to the embodiment 400 in FIGS. 4A-4D wherein the microfluidic components composed of a microvalve and pressure sensor were implemented using semiconductor fabrication techniques in silicon, the embodiment 600 in FIGS. 6A and 6B has the microvalve made directly into the LTCC layers and the pressure sensor is made using silicon semiconductor fabrication techniques.

The device 602 has an inlet port 606 and an outlet port 605. There is a flow channel 615 that extends from the inlet port 606 to the underside of the one-way check microvalve 603. There is also a flow channel 607 extending from the chamber 616 above the one-way check microvalve 603 to the outlet port 605. There are pre-determined electrical interconnections 608 made in the LTCC layers 617 in the vertical direction by the filling of vias with an electrically conductive material as well as horizontally by screen printing electrically conductive materials on the surfaces of the LTCC layers, as described above. In some examples, only a portion of the vias may be selectively filled among a plurality of vias on an LTCC layer. Some of these electrical interconnections 608 extend to the top surface of the microfluidic system 602 wherein they connect to electrical contact pads 611 for making electrical connection to the microfluidic system 602. The LTCC layers have bonding layers 601, 613 and 614 for attaching different component modules of the LTCC together during fabrication as will be explained below. A pressure sensor 604 is positioned within the microfluidic system 602 so that the underside of the pressure sensor 604 is in contact with the fluid inside the microfluidic chamber 616. A bonding layer 622 is provided for attaching the pressure sensor 604 to the microfluidic system 602.

A bonding layer 612 is provided for attaching the microfluidic system 602 to another substrate, if desired. The one-way check microvalve 603 consists of a portion of a patterned metal cantilever structure 610 that extends over the flow channel 615 and also extends over an electrode 609. There is an insulating layer 620 positioned between the one-way check microvalve 603 electrodes 609 and 610 to prevent the electrical shorting of the electrodes 609 and 610 if they were to come into contact. There is also a very small air gap 621 positioned above the insulating layer 620 and between the electrodes 609 and 610.

If a voltage is applied across the electrodes 609 and 610, the cantilever 610 will be electrostatically attracted to the bottom electrode 609 and will not move to open the fluid channel 615 (e.g., a pathway) even if there is a fluid pressure on the backside of the one-way check microvalve 603 from the flow channel 615. The check microvalve shown in FIG. 6A is in the closed state.

Figure 6B:
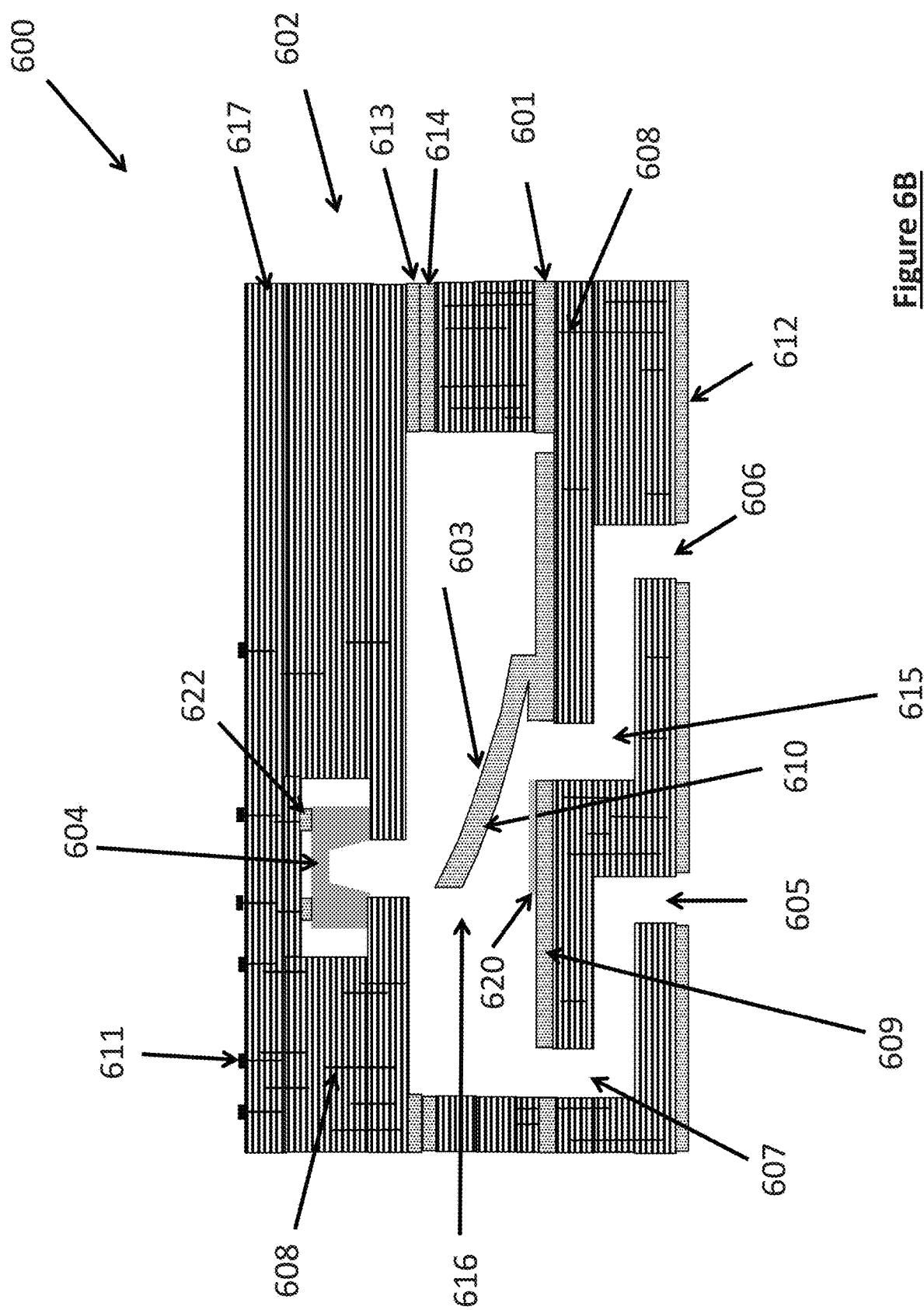

The same integrated microfluidic system 602 when the one way check microvalve 603 is in an open state is shown in FIG. 6B. In this state, no voltage is applied to the electrodes 609 and 610 and therefore the only resisting force of the cantilever 603a is the mechanical stiffness of the cantilever 603a. If the force (or pressure which is force per unit area) is sufficiently high to overcome of the mechanical stiffness of the cantilever 603a, the cantilever 603a will deflect upwards as shown in FIG. 6B. In this state, fluid entering the inlet port 606 can flow through the flow channel 615, through the opening resulting from the deflected cantilever 603a, enter the chamber 616, and flow into the flow channel 607 and outward through the outlet port 605. Additionally, the fluid pressure can be measured by the pressure sensor 604 when the cantilever 603a is deflected and the one-way check microvalve 603 is in the open state.

Figure 7A:
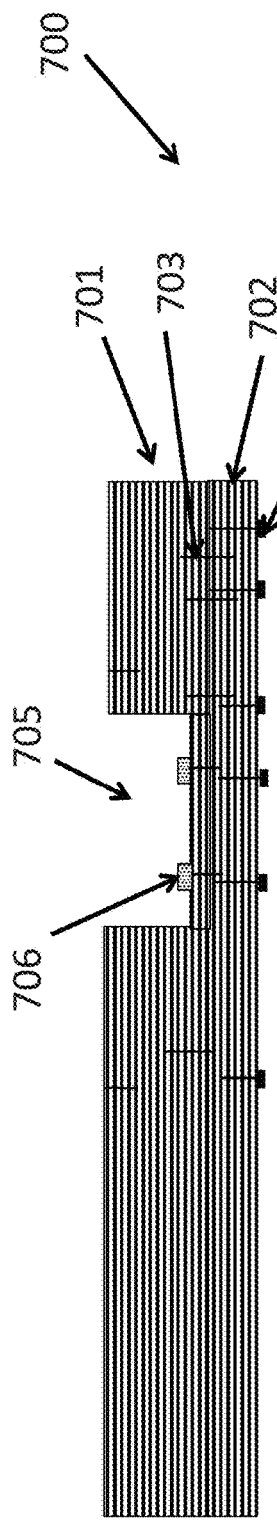
FIGS. 7A through 7N are cross section illustrations of the method of implementing the device of FIGS. 6A and 6B.
Figure 7B:
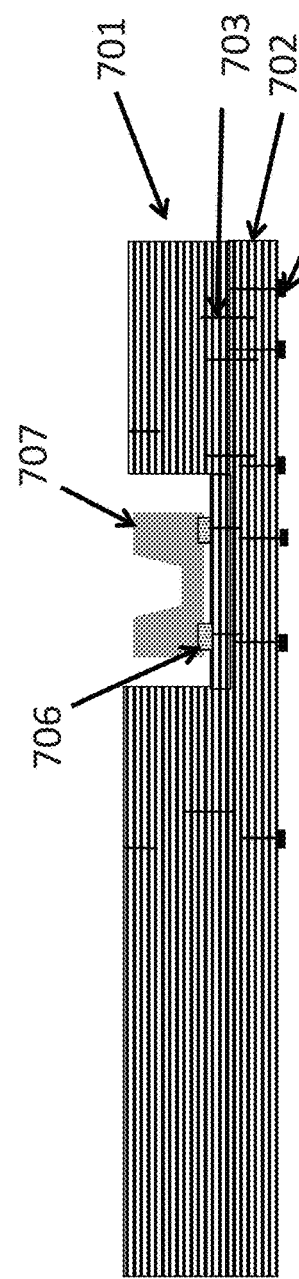
Figure 7C:
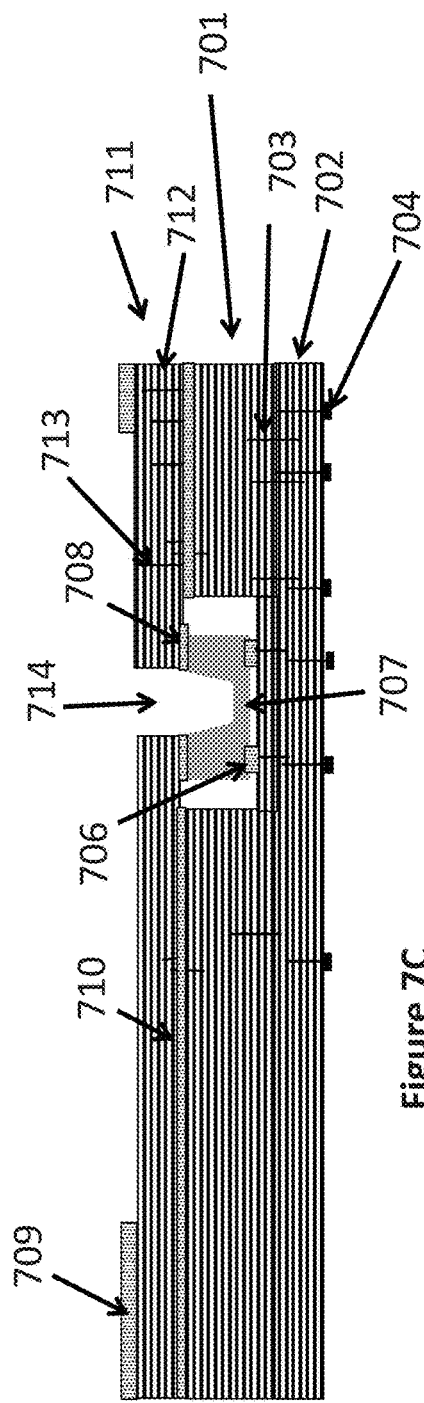
Figure 7H:
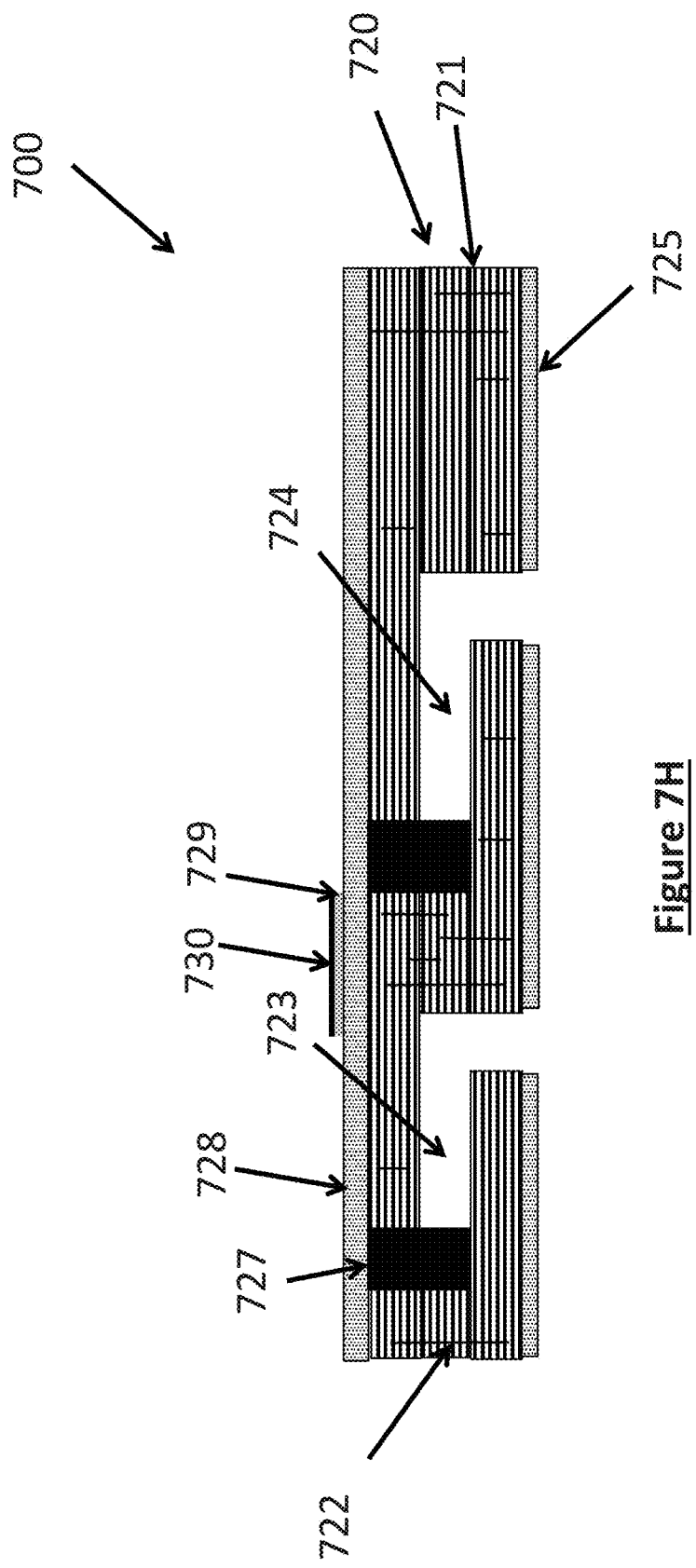
Figure 7M:
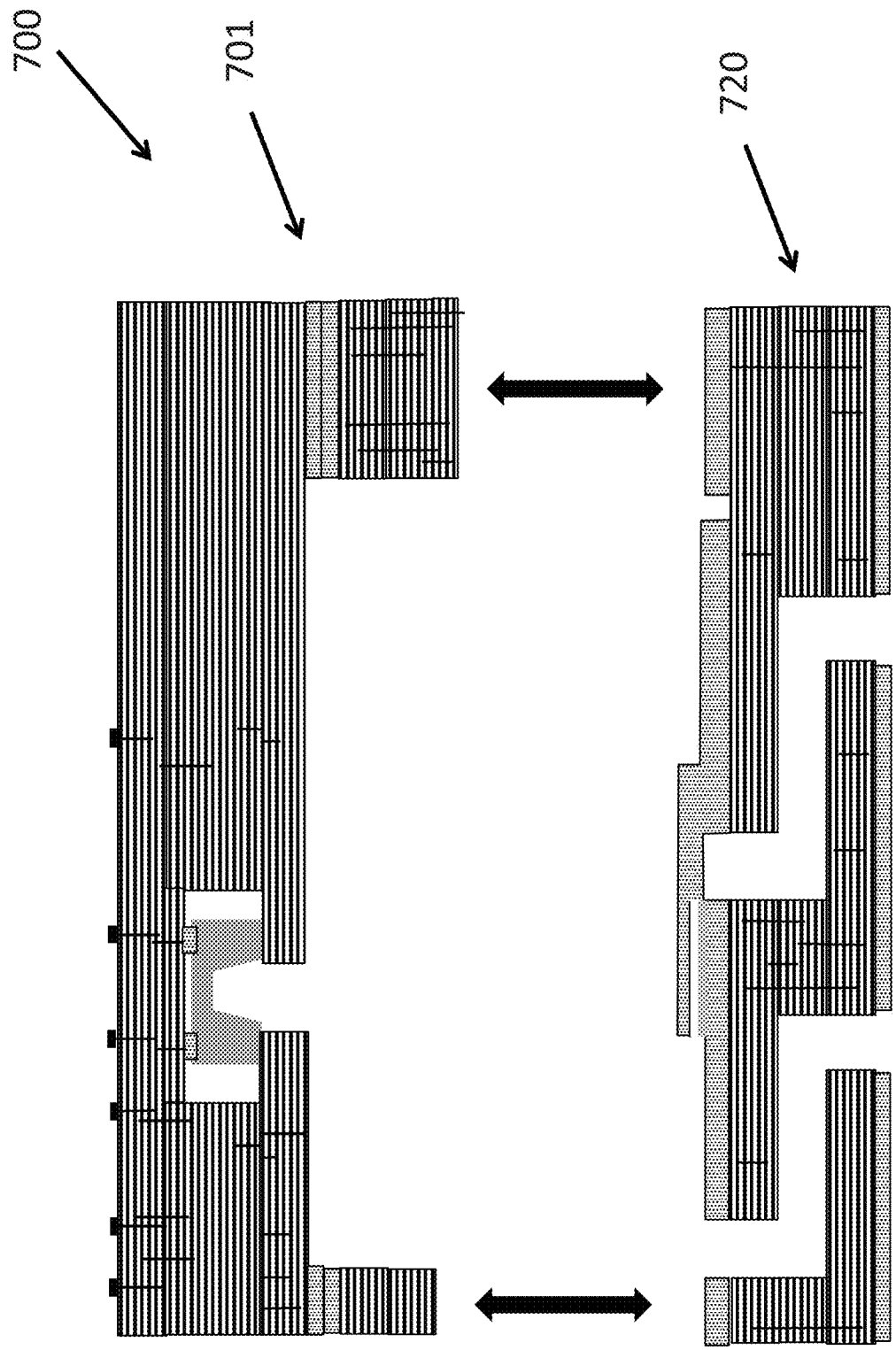
Figure 7N:
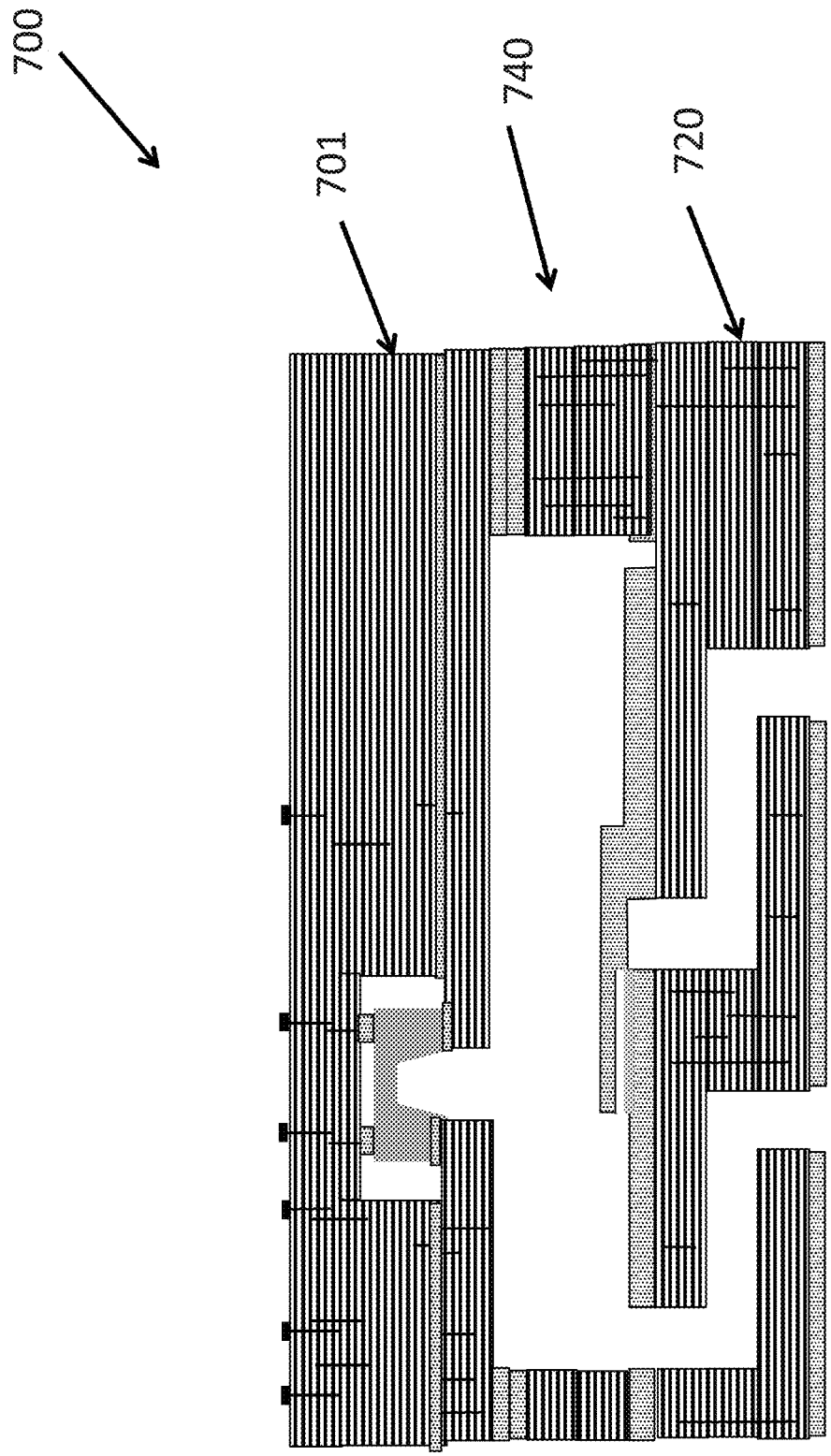

The embodiment 700 of the method of fabrication of the microfluidic system shown in FIGS. 6A and 6B is illustrated in FIGS. 7A-7N. The fabrication essentially follows the methods described above wherein individual layers of LTCC green tape are patterned and processed to make fluidic channels, electrical connections, and bonding areas. However, the fabrication herein also includes the micromachining of micro-mechanical functional devices directly into the layers on the LTCC as will be described.

Starting in FIG. 7A, a number of individual LTCC green tape layers 702 have pre-determined pattern made into and on them as described above; by making openings 705 in the green tape to implement openings for devices; vias 703 that are filled with an electrical conductive material to make vertical electrically interconnects; and screen printed electrically conductive materials to implement horizontal interconnects on the surfaces of LTCC layers 702. Some of the vias 703 contact to pre-determined electrical contact pads 704 located on the surface of the composite LTCC module 701. Also, a bonding material 706 is deposited and patterned within the opening 705 of the module 701. Once the layers of LTCC green tape have been patterned and processed, they are aligned and stacked into a composite module as shown in FIG. 7A. The composite module 701 can be exposed to an elevated temperature to co-fire and transition the LTCC green tape into a LTCC ceramic composite module 701.

Next, as shown in FIG. 7B, a device die 707, in this case a pressure sensor, is bonded to the patterned bonding material layer 706 within the opening made 705 in the stacked LTCC layers 702.

Subsequently, a separately processed LTCC ceramic module 711 is made from processing and patterning individual layers 712 of LTCC green tape wherein the LTCC layers 712 are processed and patterned in a pre-determined manner to form openings 714 for access to the pressure sensor (e.g., the device die 707), vertical electrical interconnections 713 using vias filled with an electrically conductive material, and horizontal electrical interconnections using screen printing of electrically conductive materials. The module 711 has a deposited and patterned bonding material on both the top 709 and bottom sides 710 of the module 711.

The module 711 may be exposed to an elevated temperature to transition and co-fire the LTCC layers 712 into a ceramic LTCC module 711 that is then aligned and bonded to the first module 701 as shown in FIG. 7C. Alternatively, the LTCC layers 712 of module 711 may be processed and patterned and then aligned to the module 701 and then the entire composite module 701 and 711 exposed to an elevated temperature to transition and co-fire the LTCC green tape into a LTCC ceramic composite module with the result the same as shown in FIG. 7C.

Another module 716 of individually processed and patterned layers according to a pre-determined design is made from LTCC green tape wherein the LTCC layers are processed to form openings 718, vertical electrical interconnections 717 using vias filled with an electrically conductive material, and horizontal electrical interconnections using screen printing of electrically conductive materials.

The module 716 has a deposited and patterned bonding material on the bottom sides 715 of the module 716.

The module 716 may be exposed to an elevated temperature to transition and co-fire the LTCC layers into a ceramic LTCC module 716 that is then aligned and bonded to the composite first module 701 and second module 711 as shown in FIG. 7D. Alternatively, the LTCC layers of module 716 may be processed and patterned and then aligned to the composite module 701 and 711 and then the entire composite module 701, 711, and 716 may be then exposed to an elevated temperature to transition and co-fire the LTCC green tape into a LTCC ceramic composite module 701, 711 and 716 with the result the same as shown in FIG. 7D.

A separate module 720 is implemented in the methods as described above, by individually patterning and processing layers 721 of LTCC green tape according to a pre-determined design. Some of the layers 721 have openings 723 and 724 made into them to form fluidic channels in the layers 721, while some of the layers 721 have vias 726 made into them that are filled with an electrically conductive material to form vertical electrical interconnections between the layers 721. Some of the layers 721 will have screen printed features of electrically conductive material is order to form horizontal electrical interconnects.

A bonding material layer 725 may also be made on one or more of the surfaces of the module 720. The layers 721 of LTCC green tape after patterning and processing, are aligned and stacked together to form a composite structure (e.g., module 720) of LTCC green tape that is then exposed to an elevated temperature to transition and co-fire the LTCC green tape into a LTCC ceramic module 720 as shown in FIG. 7E.

The module 720 then has a sacrificial material 727 used to fill the openings in the top surface of the module 720 as shown in FIG. 7F. Chemical-mechanical polishing (CMP) may then be performed on the top surface of the module 720 in order to reduce the surface roughness to levels that thin-film processing used in the semiconductor industry can be used. Note: the module 720 may also be formed and shaped into a standard diameter for semiconductor fabrication equipment.

Next, a thin-film layer 728 is deposited as shown in FIG. 7G. This layer 728 will be an electrically conductive material, such as a material, that will be later formed into part of the check microvalve.

A thin film layer of an electrically insulating material 729 is deposited and patterned on top of the electrical conductive layer 728. This layer 729 will ensure the electrodes of the one-way check microvalve are not electrically shorted.

A thin film sacrificial layer 730 is deposited and patterned on top of the electrical insulating layer 729. The thin film sacrificial layer 730 will ensure the cantilever electrode of the one-way check microvalve can move freely. The result is shown in FIG. 7H.

It should be noted that the deposition and patterning of the two layers of insulting material and sacrificial material can be performed in reverse order without difficulty.

Next a spacer sacrificial layer 731 is deposited and patterned to bring the level of the sacrificial layer upwards as show in FIG. 7I. The deposited conductive layer 728 is patterned also as shown in FIG. 7I.

Next, as shown in FIG. 7J, a thin-film layer 732 composed of an electrically conductive material is deposited onto the top surface of the module 720. This layer 732 then has photolithography performed followed by an etching to pattern the layer 732 to form the top part of the one-way check microvalve, including the cantilever electrode 732 as shown in FIG. 7K.

The sacrificial layers 727 filling the openings in the module and between the one-way check microvalve electrodes 730 are then removed as shown in FIG. 7L. There is an air gap 733 between the electrodes 722 and 732.

Next, as shown in FIG. 7M the top module 701 and bottom module 720 are aligned so that the areas meant for bonding come into physical contact and the module pair are bonded together to implement the composite fabricated module 740 shown in FIG. 7N.

Figure 8A:
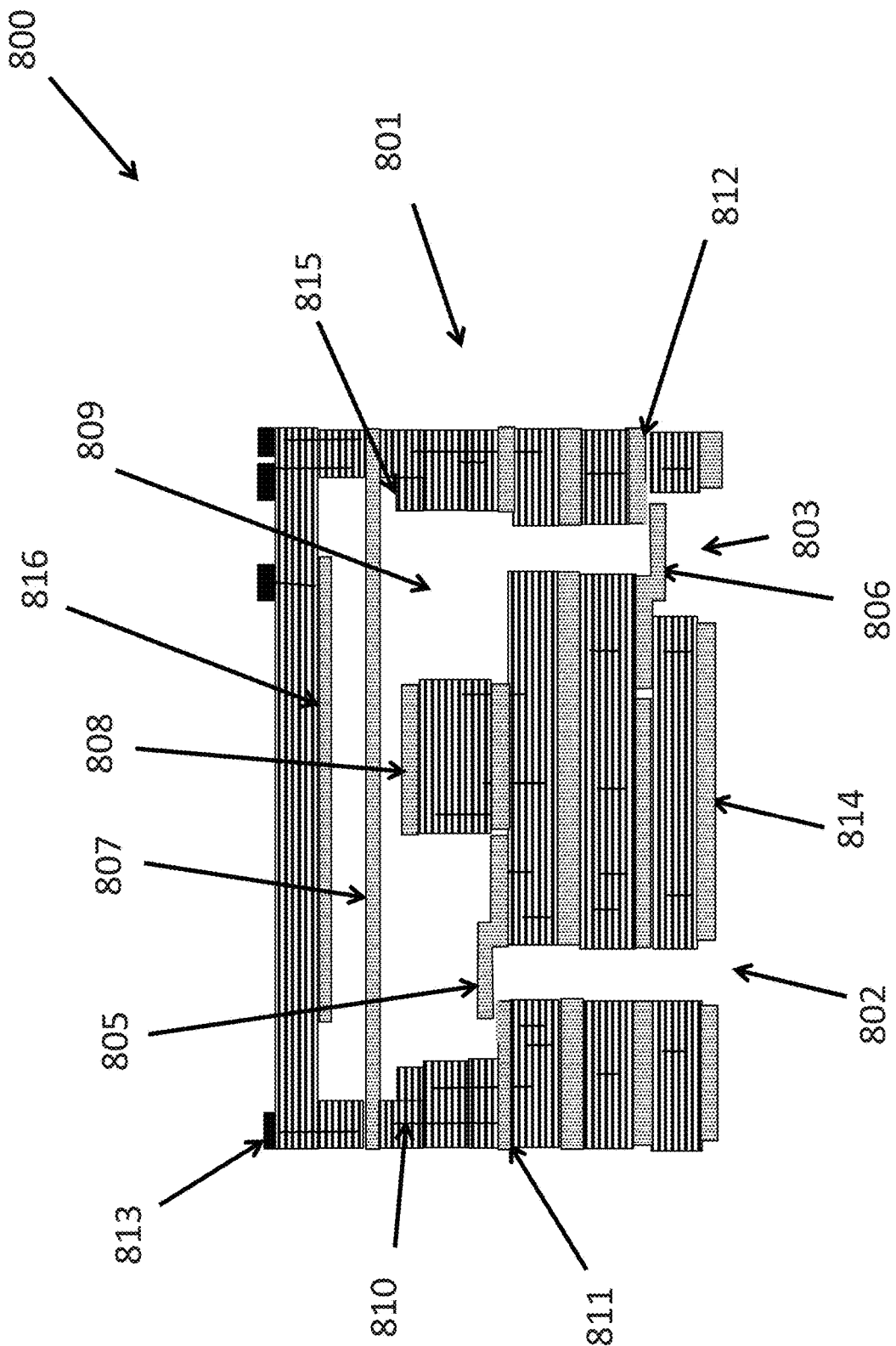
FIGS. 8A through 8C are cross sections of a micropump made using LTCC.
Figure 8B:
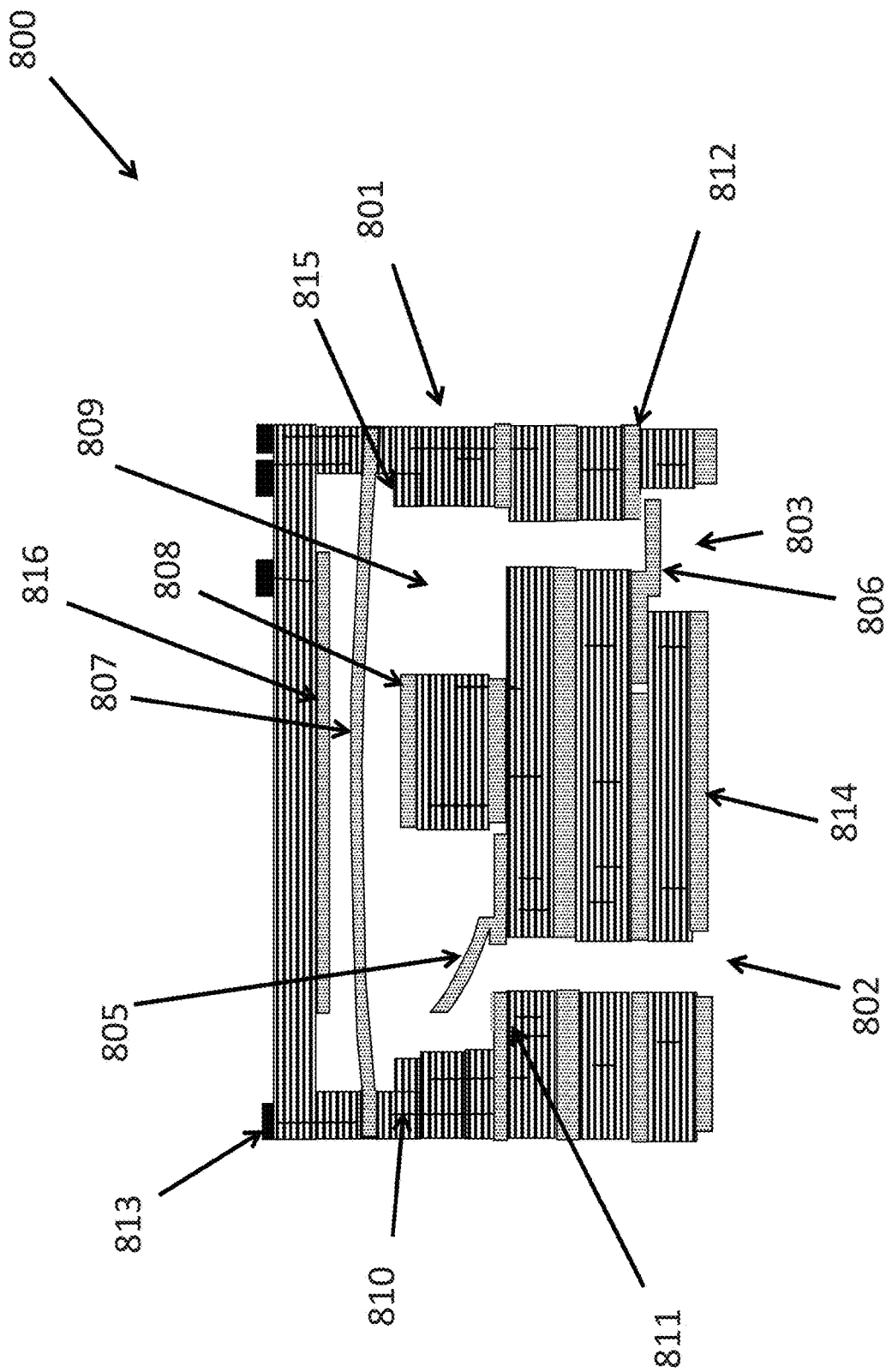
Figure 8C:
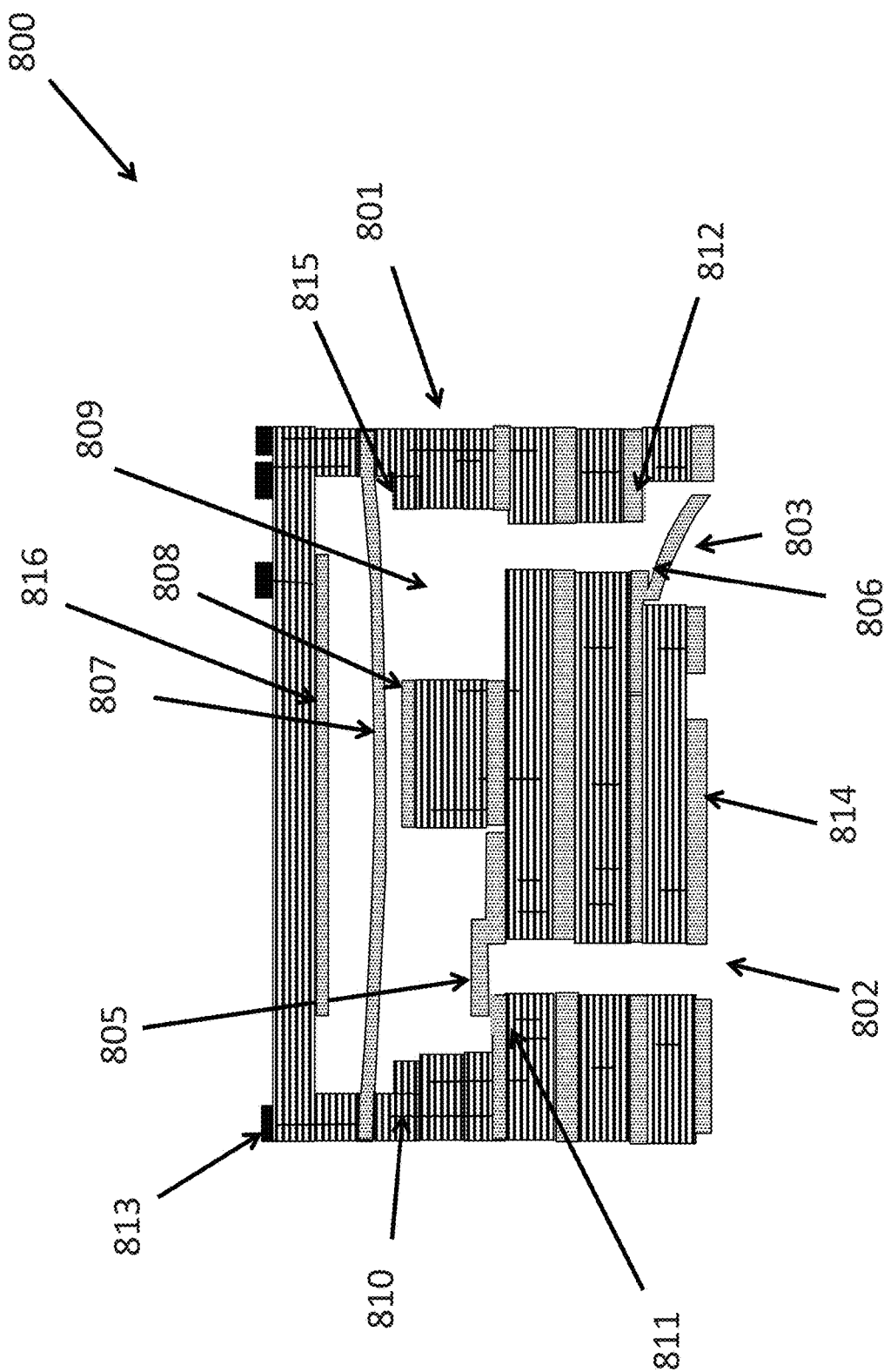

Another embodiment of a system 800 of the present invention is shown in FIGS. 8A-8C. In this example of a micropump, the entire microfluidic system is made completely of LTCC processes and no semiconductor die are used in this system 800.

The device in FIGS. 8A-8C is a micropump 801. This device functions to pump (or transfer) fluids from one fluidic port 802 to the other fluid port 803 and to increase the fluid pressure across the fluidic ports 802 and 803.

The micropump 801 consists of two one-way check microvalves 805 and 806 and a movable membrane 807 that is electro-statically actuated. The device 801 as shown in FIG. 8A is not in an active state since no electrostatic voltage is applied to the movable membrane 807 to displace it and both check microvalves 805 and 806 are closed. Each of the one-way check microvalves has a counter electrode 811 and 812 that can be used to close the check valve with an applied voltage.

The micropump 801 is completely made from LTCC layers. There is a micropump chamber 809 that contains the fluid inside the micropump 801. The movable membrane 807 is made from an electrically conductive material or materials, such as a metal, that are a standard component of the LTCC process. There are two counter electrodes 816 and 808 on either side of the movable membrane 807.

When a voltage is applied to the top electrode 816, the movable membrane 807 will deflect towards the top electrode 816 due to the electrostatic forces between two movable membrane 807 (electrode) and 816 due to the electrical field between them. The movement of the movable membrane 807 toward the top electrode 816 will cause the micropump 801 chamber 809 to increase in volume. When the applied voltage to the top electrode 816 is removed, the movable membrane 807 will return to its neutral un-deflected position and the volume of the chamber 809 returns to its neutral un-deflected position that is the pump quiescent state.

Likewise, when a voltage is applied to the bottom electrode 808 it causes the movable membrane 807 to deflect toward the bottom electrode 808 due to the electrostatic forces between the movable membrane 807 807(electrode) and the electrode 808 with an electrical field exists between them. The movement of the movable membrane 807 towards the bottom electrode 808 will cause the micropump 801 chamber 809 to decrease in volume. When the applied voltage to the bottom electrode 808 is removed, the movable membrane 807 will return to its neutral un-deflected position that is the pump quiescent state.

The micropump 801 has vertical electrical interconnections 810 made by filling pre-determined patterns of vias with an electrically conductive material into the layers of the LTCC green tape as described above. The micropump 801 also has horizontal electrical interconnections made onto the surfaces of the layers of LTCC green tape with an electrically conductive material as described above. Some of these vertical and horizontal electrical interconnects are connected to the electrical pads 813 on the outer surfaces of the micropump 801 so as to make electrical connection to the components interior to the micropump 801.

The one-way check microvalve 805 can be opened to allow fluid to enter the micropump 801 if the fluid pressure entering the inlet port 802 is sufficient to overcome the mechanical stiffness of the check microvalve cantilever of the one-way check microvalve 805 and if there is no applied voltage between the counter electrode 811 and cantilever electrode of the one-way check microvalve 805 of the one-way check microvalve 805. Similarly, the one-way check microvalve 806 can be opened to allow fluid to exit the micropump 801 if the fluid pressure inside the chamber 809 is sufficient to overcome the mechanical stiffness of the one-way check microvalve cantilever 806 and if there is no applied voltage between the counter electrode 812 and the cantilever electrode 806 of the one-way check microvalve 806.

The micropump 801 is shown in one of the two states of active operation in FIG. 8B. As shown, there is an applied voltage between the top electrode 816 and the movable membrane 807 that causes the movable membrane 807 to displace towards the top electrode 816. This increases the volume inside the micropump 801 chamber 809 and results in a negative fluidic pressure in the chamber 809. This negative fluidic pressure inside the chamber 809 causes the cantilever of the one-way check microvalve 805 on the entry side of the micropump 801 to open allowing fluid to enter into the inlet port 802, through the one-way check microvalve 805 and into the micropump 801 chamber 809.

Subsequently, as shown in FIG. 8C, the applied voltage to the top electrode 816 is removed and an applied voltage is placed between the bottom electrode 808 and the movable membrane 807 that results in the movable membrane 807 displacing toward the bottom electrode 808 resulting in the volume inside the micropump 801 chamber 809 to decrease. This creates a positive fluidic pressure on the fluid inside the chamber 809 causing the fluid pressure on the underside of the cantilever 806 to open the one-way check microvalve 806 allowing the flow of fluid from the chamber 809 and thereby pushing the fluid from the chamber 809 outward through the outlet port 803 of the micropump 801.

This cycle of alternating the applying voltages across the top electrode 816 and the membrane 807 and across the bottom electrodes 808 and the membrane 807 continues thereby resulting in a constant stream of fluid being pumped from the inlet 802 of the micropump 801 to the outlet 803 of the micropump 801. Additionally, the fluid pressure exiting the outlet 803 of the micropump 801 will be at a higher pressure than the fluid entering the inlet 802 of the micropump 801.

Figure 9D:
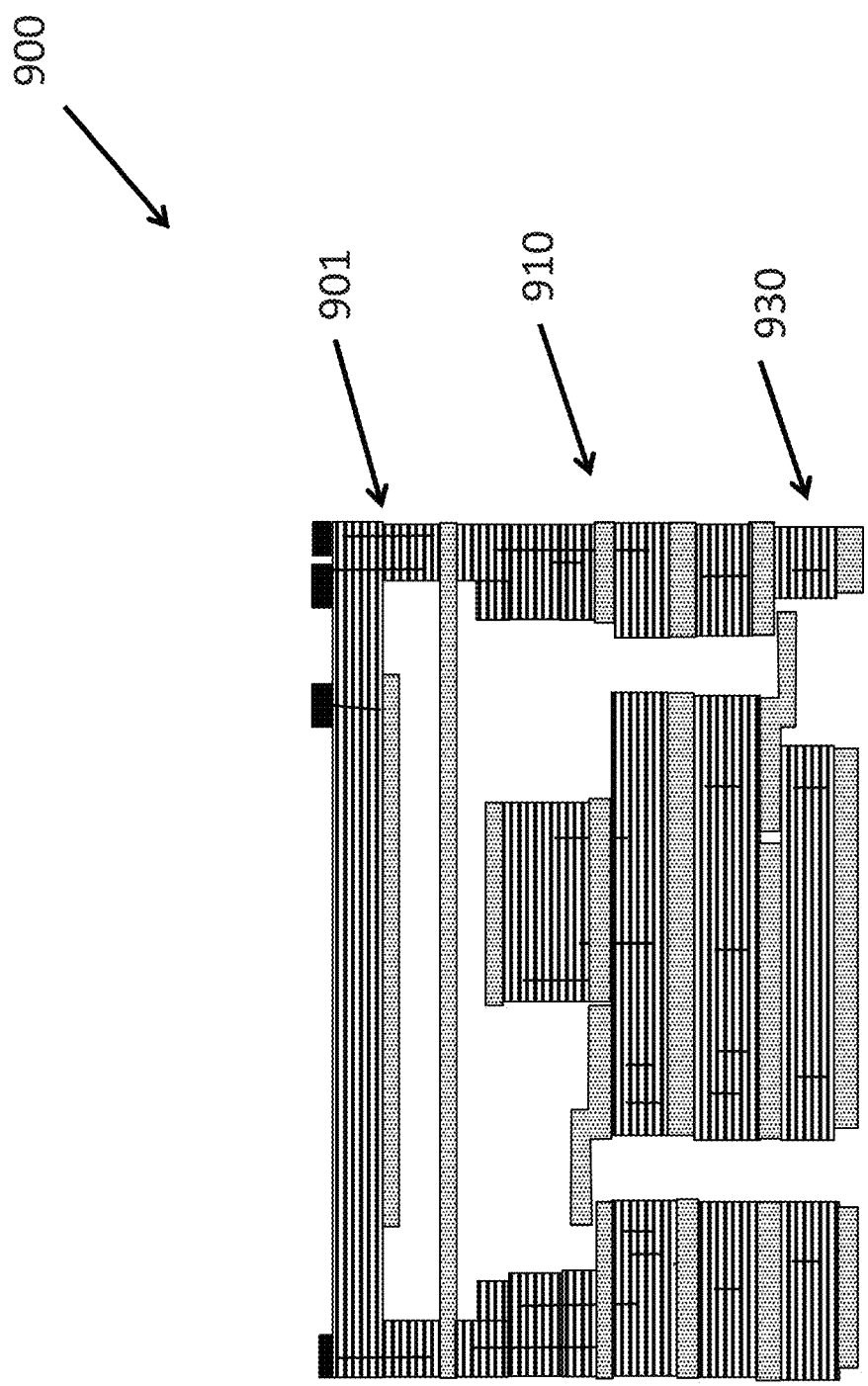

The implementation of the micropump 801 is illustrated in FIGS. 9A-9D. The top module 901 component of the micropump is shown in FIG. 9A and consists of patterned and processed, aligned and stacked layers 902 of LTCC. There is an open cavity formed 906 as well as a suspended movable membrane 903. The layers 902 of LTCC have pre-determined patterns of vias 905 filled with electrically conductive material to form vertical electrical interconnects and pre-determined printed patterns of an electrically conductive material of the surfaces of the of the LTCC layers 902 to form horizontal electrical interconnects. Some of these interconnects are connected to electrical contact pads 904 made on the exterior surface of the stacked LTCC module 901. There is also a top electrode 920 made inside the open cavity 906.

The middle module 910 is shown in FIG. 9B and consists of patterned and processed, aligned and stacked layers 911 of LTCC. There is an open cavity 916 that will constitute the micropump chamber, a bottom electrode 922, as well as a one-way check microvalve 919 situated over a flow channel 913 that will connect to the inlet port 934 of the device. There is an electrode 918 to the one-way check microvalve 919. The layers 911 of LTCC have pre-determined patterns of vias 912 filled with electrically conductive material to form vertical electrical interconnects and pre-determined printed patterns of an electrically conductive material of the surfaces of the of the LTCC layers 911 to form horizontal electrical interconnects. Some of these interconnects are connected to electrical contact pads 915 made on the exterior surface of the stacked LTCC module 910. The material layer (e.g., electrical contact pads 915) on the bottom surface of the module 910 also is for bonding of the modules. There is also a fluid channel 914 made in the layers 911 of LTCC that will connect to the outlet port 935 of the micropump. Bonding surfaces 917 are implemented for bonding the top module 901 and middle module 910 together. A spacer 921 is also made in the LTCC layers 911.

The bottom module 930 shown in FIG. 9C consists of patterned and processed, aligned and stacked layers 940 of LTCC. There is a one-way check microvalve 937 situated over outlet port 935 of the device. There is an electrode 936 to the one-way check microvalve 937. The layers 940 of LTCC have pre-determined patterns of vias 931 filled with electrically conductive material to form vertical electrical interconnects and pre-determined printed patterns of an electrically conductive material of the surfaces of the of the LTCC layers 940 to form horizontal electrical interconnects. Some of these interconnects are connected to electrical contact pads 933 made on the exterior surface of the stacked LTCC module 930. The material layer (e.g., electrical contact pads 933) on the bottom surface of the module 930 also is for bonding of the modules. There is an intermediary layer 932 of an electrically conductive material that can also be used for bonding and electrical conduction.

The arrows between the modules 901, 910 and 930 illustrate the bonding of the modules 901, 910 and 930 to one another. The complete micropump device is shown in FIG. 9D after the modules 901, 910 and 930 have undergone bonding to form the composite structure and device.

Figure 10S:
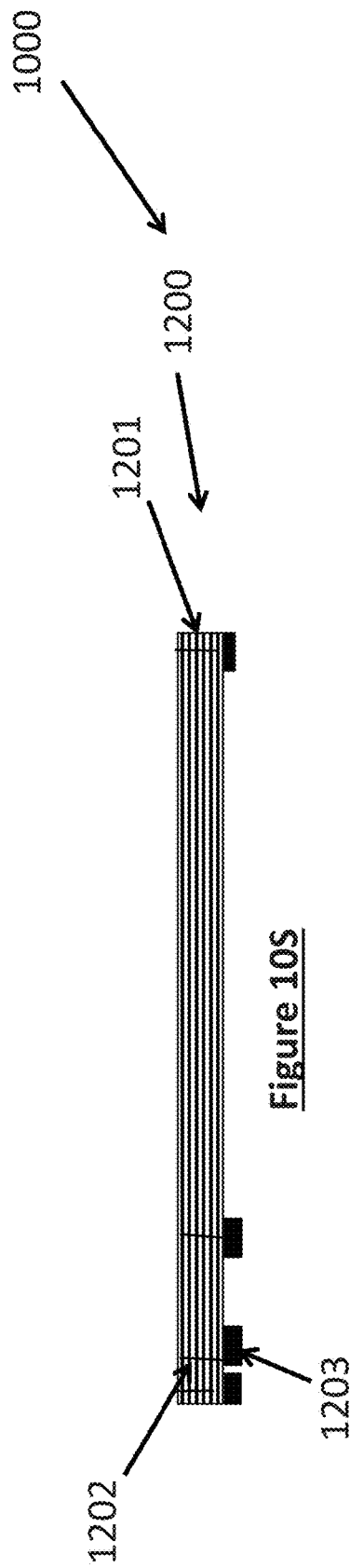
FIGS. 10A through 10Z is a detailed method of the fabrication of the micropump shown in FIGS. 8A through 8C.
Figure 10T:
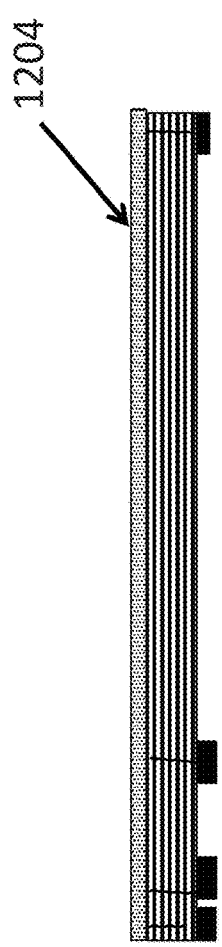
Figure 10U:
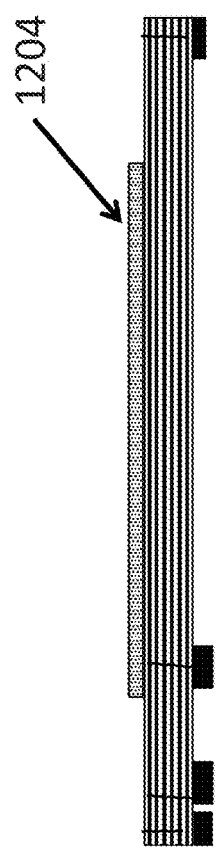
Figure 10X:
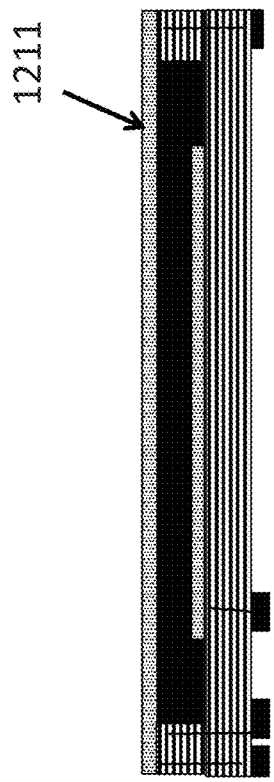
Figure 10Y:
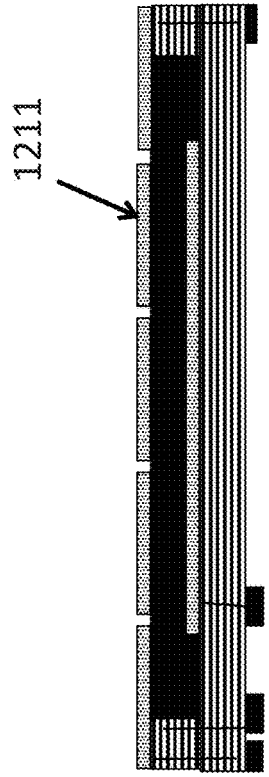
Figure 10Z:
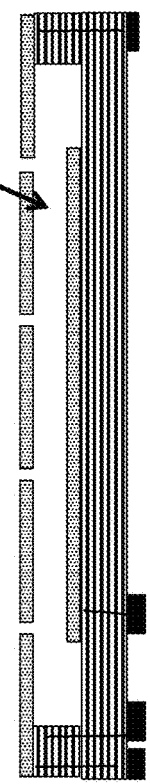

The detailed embodiment 1000 of the method of implementation of the micropump is illustrated in FIGS. 10A-10Z. As described above, individual layers 1002 of LTCC green tape are patterned and processed to create openings 1003 for fluidic pathways. The layers 1002 of LTCC have pre-determined patterns of vias filled with electrically conductive material to form vertical electrical interconnects and pre-determined printed patterns of an electrically conductive material of the surfaces of the of the LTCC layers 1002 to form horizontal electrical interconnects as seen in FIG. 10A. These layers 1002 are then aligned and stacked and exposed to an elevated temperature to co-fire and transition the LTCC green tape into an LTCC ceramic module 1001.

A sacrificial material 1005 is used to close the openings 1003 in the module 1001 as shown in FIG. 10B.

Then, as shown between FIGS. 10B and 10C, the surface of the module 1001 has chemical-mechanical polishing (CMP) performed on it to reduce the roughness of the surface substantially. This will allow the surface of the LTCC module 1001 to undergo semiconductor fabrication methods.

Next, as shown in FIG. 10D a layer of electrically conductive material 1006 is deposited onto the surface of the module 1001. Photolithography is then performed onto this layer 1006, followed by etching to pattern the layer 1006 as shown in FIG. 10E.

An electrically insulating layer 1008 is deposited and patterned. This layer 1008 will prevent the one-way check microvalve electrodes from electrically shorting. Another sacrificial layer 1009 acting as a thin spacer layer is deposited and patterned. This layer will allow the electrodes of the one-way check microvalve to be separated. The result in shown in FIG. 10F.

Then an electrically conductive layer 1010 is deposited onto the surface of the module 1001 as shown in FIG. 10G. This is followed by photolithography and etching to pattern this layer 1010. The next step is the removal of the sacrificial layers 1009 and 1004 as shown in FIG. 10H.

Another module 1020 that is made by patterning and processing LTCC green tape layers 1021 has been made with pre-determined electrical interconnections 1022, both vertical and horizontal, in and on the layers 1021 as before. The module 1020 also has open areas 1023 and 1024 made by patterning portions of the LTCC layers 1021. There is an electrically conductive material layer 1022 that has been deposited and patterned. These patterned and processed layers of LTCC green tape are aligned and stacked into a module 1020. This module 1020 is exposed to an elevated temperature to co-fire and transition the LTCC green tape into a LTCC ceramic module 1020.

The module 1001 is then aligned and bonded to the other module 1020 as shown in FIG. 10I.

Another LTCC module 1100 is made as shown in FIG. 10J.

As described above, individual layers 1101 of LTCC green tape are patterned and processed to create openings 1102 for fluidic pathways. The layers 1101 of LTCC have pre-determined patterns of vias 1103 filled with electrically conductive material to form vertical electrical interconnects and pre-determined printed patterns of an electrically conductive material of the surfaces of the of the LTCC layers 1101 to form horizontal electrical interconnects as seen in FIG. 10J. These layers 1101 are then aligned and stacked and exposed to an elevated temperature to co-fire and transition the LTCC green tape into an LTCC ceramic module 1100.

A sacrificial material 1104 is used to close the openings 1102 in the module 1100 as shown in FIG. 10K.

Then, as shown between FIGS. 10K and 10L, the surface of the module 1101 has chemical-mechanical polishing (CMP) performed on it to reduce the roughness of the surface substantially. This will allow the surface to undergo semiconductor fabrication methods.

Next, as shown in FIG. 10M a layer of electrically conductive material 1105 is deposited onto the surface of the module 1101. Photolithography is then performed onto this layer 1105, followed by etching to pattern the layer 1105 as shown in FIG. 10N. Another sacrificial layer 1108 is deposited and patterned as shown in FIG. 10O.

Then a layer of electrically insulating material layer 1109 is deposited and patterned. This layer will prevent the electrodes of the one-way check microvalve from electrically shorting. Subsequently, a thin layer 1110 of a sacrificial material is deposited and patterned. This layer will allow a gap to be created by the electrodes of the one-way check microvalve. Then an electrically conductive layer 1111 is deposited onto the surface of the module 1101 as shown in FIG. 10P.

This is followed by photolithography and etching to pattern this layer 1111, followed by the removal of the sacrificial layers 1004, 1008 and 1110 as shown in FIG. 10Q.

Another module 1114 that is made by patterning and processing LTCC green tape layers 1115 with pre-determined patterns of electrical interconnections 1116, both vertical and horizontal, in and on the layers 1115 as before; that also has open areas 1117 made by patterning portions of the 1115 LTCC layers; and a deposited electrically conductive material layer 1118 that has been deposited and patterned. These patterned and processed layers 1115 of LTCC green tape are aligned and stacked into a module 1114. This module 1114 is exposed to an elevated temperature to co-fire and transition the LTCC green tape into a LTCC ceramic module 1114. The module 1001 is then aligned and bonded to the other module 1114 as shown in FIG. 10R.

Another LTCC module 1200 is made by patterning and processing LTCC green tape layers 1201 with pre-determined patterns of electrical interconnections 1202, both vertical and horizontal, in and on the layers 1201 as before; and electrical pads 1203 that connect to some of the electrical interconnections 1202.

These patterned and processed layers 1201 of LTCC green tape are aligned and stacked into a module 1200. This module 1200 is exposed to an elevated temperature to co-fire and transition the LTCC green tape into a LTCC ceramic module 1200 as shown in FIG. 10S.

A thin film layer 1204 of an electrically conductive material is then deposited as shown in FIG. 10T. This layer 1204 then has photolithography and patterning performed as shown in FIG. 10U.

Another module 1206 is made by patterning and processing LTCC green tape layers 1207 with pre-determined patterns of electrical interconnections 1208, both vertical and horizontal, in and on the layers 1207 as before; and open areas 1209.

These patterned and processed layers 1207 of LTCC green tape are aligned and stacked into a module 1206. This module 1206 is exposed to an elevated temperature to co-fire and transition the LTCC green tape into a LTCC ceramic module 1206. Module 1206 is then aligned and bonded to module 1200 resulting in the composite module shown in FIG. 10V. A sacrificial material 1210 is then used to fill the open area 1209 in the module 1206 as shown in FIG. 10W. An electrically conductive layer 1211 is then deposited as shown on FIG. 10X. This layer 1211 is then patterned as shown in FIG. 10Y. Then the sacrificial material 1210 is removed from the space 1212 as shown in FIG. 10Z.

Then as shown in FIGS. 9A-9C, the three completed modules 901, 910 and 930 are aligned and bonded to form the completed device shown in FIG. 8A.

Figure 11:
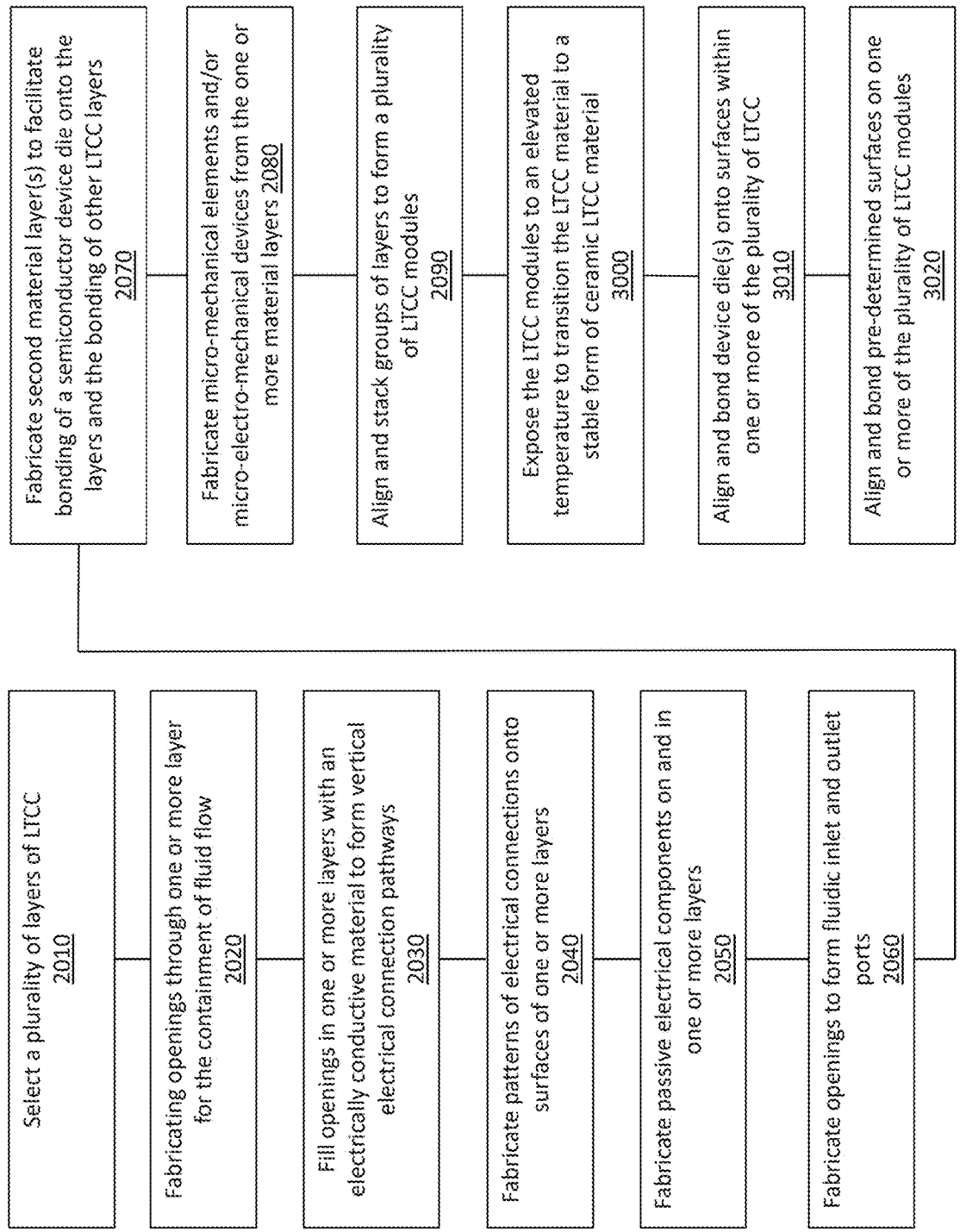
FIG. 11 illustrates steps of a method for fabrication of a microfluidic device or system made of a plurality of individually patterned layers of low-temperature co-fired ceramic (LTCC) material.

FIG. 11 illustrates steps of a method for fabrication of a microfluidic device or system made of a plurality of individually patterned layers of low-temperature co-fired ceramic (LTCC) material. While operations in FIG. 11 are shown in a specific order, one or more of the operations may be omitted, substituted by another operations, and/or repeated.

Fabricating the microfluidic device or system may include: selecting a plurality of layers of LTCC material of pre-determined types, sizes and thicknesses (step 2010); fabricating openings of pre-determined sizes, shapes and locations through one or more layer of the plurality of LTCC layers for the containment of fluid flow (step 2020); selectively filling pre-defined openings in one or more layers of the plurality of LTCC layers with an electrically conductive material to form vertical electrical connection pathways through the LTCC layers (2030); fabricating pre-determined patterns of electrical connections onto surfaces of one or more layers of the plurality of LTCC layers to form horizontal electrical connection pathways across the LTCC layers using an electrically conductive material (step 2040); fabricating pre-determined types and sizes of passive electrical components with an electrically conductive material on and in one or more layers of the plurality of LTCC layers (step 2050); fabricating openings of pre-determined sizes, shapes, and locations through the thickness of one or more layer of the plurality of LTCC layers to form fluidic inlet and outlet ports (step 2060); fabricating one or more second material layers with pre-determined patterned features on the surfaces of the plurality of LTCC layers to facilitate bonding of a semiconductor device die onto the layers and the bonding of other LTCC layers (step 2070); fabricating one or more micro-mechanical device and/or micro-electro-mechanical device from the one or more second material layers in and/or on the plurality of LTCC layers (step 2080); aligning and stacking groups of layers of the plurality of LTCC layers to form a plurality of LTCC modules (2090); exposing the LTCC modules to an elevated temperature to transition the LTCC material to a stable form of ceramic LTCC material (step 3000); aligning and bonding one or more device dies onto pre-determined surfaces within one or more of the plurality of LTCC modules (step 3010); and aligning and bonding pre-determined surfaces on one or more of the plurality of LTCC modules to form a complete microfluidic device (step 3020).

Figure 12:
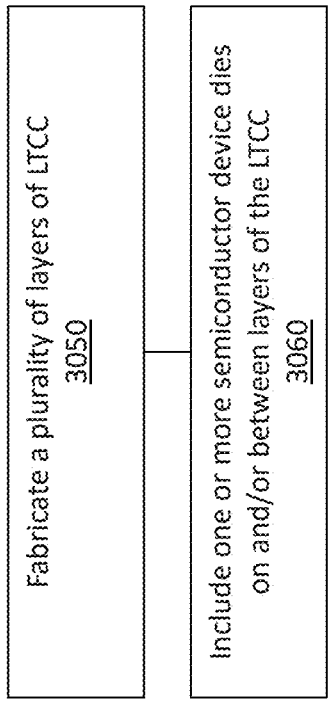
FIG. 12 illustrates a method for fabrication of a microfluidic device or system according to one embodiment of the present technology.

FIG. 12 illustrates a method for fabrication of a microfluidic device or system according to one embodiment of the present technology. The method may include fabricating a plurality of layer of LTCC (step 3050) and including one or more semiconductor device dies on and/or in between layers of the LTCC (step 3060). In some examples, the semiconductor device die may include MEMS microfluidic devices and/or electronics. Fabricating the plurality of layer of LTCC may include providing flow channel(s), chamber(s), one or more inlets, one or more outlets. In some examples, the plurality of layer of LTCC may include no active elements (e.g., no active components for microfluidics made from LTCC). In one example, the semiconductor device die may include one or more active elements.

Figure 13:
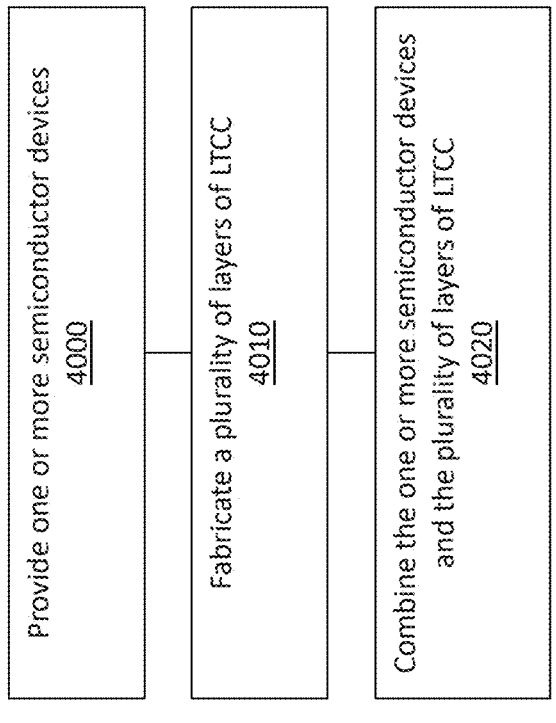
FIG. 13 illustrates a method for fabrication of a microfluidic device or system according to another embodiment of the present technology.

FIG. 13 illustrates a method for fabrication of a microfluidic device or system according to another embodiment of the present technology. The method may include providing or more semiconductor devices (step 4000), fabricating a plurality of layer of LTCC (step 4010), and combining the one or more semiconductor devices and the plurality of layers of LTCC (step 4020). The semiconductor devices may include microfluidic and/or electronics. Fabricating the plurality of layers of LTCC may include providing passive and active elements in the plurality of layer of LTCC. Combining the one or more semiconductor devices and the plurality of layers of LTCC may include providing semiconductor device(s) on and/or between surfaces of the layers of the LTCC.

FIG. 14 illustrates a method for fabrication of a microfluidic device or system according to another embodiment of the present technology. The method may include fabricating a plurality of layers of LTCC (step 4050), fabricating groups of layers of LTCC including microfluidic non-active device(s) (step 4060), and combining the plurality of layers of LTCC and the groups of layers of LTCC including the microfluidic non-active device(s) (step 4070). Combining the plurality of layers of LTCC and the groups of layers of LTCC may include providing the groups of layers of LTCC and/or between surfaces of the plurality of layers of the LTCC.

FIG. 15 illustrates a method for fabrication of a microfluidic device or system according to another embodiment of the present technology. The method may include fabricating a plurality of layers of LTCC (step S000), fabricating groups of layers of LTCC including passive element(s) (step S010), and fabricating groups of layers of LTCC including microfluidic active element(s) (step S020), and combining the plurality of layers of LTCC and the groups of layers of LTCC (step S030). Combining the plurality of layers of LTCC and the groups of layers of LTCC may include providing the groups of layers of LTCC and/or between surfaces of the plurality of layers of the LTCC.

While operations in FIGS. 12-15 are shown in a specific order, one or more of the operations may be omitted, substituted by another operations, and/or repeated. In addition, one or more operations shown in FIG. 11 may be included in the one or more operations shown in FIGS. 12-15 and/or in addition to the operations shown in FIGS. 12-15.

It should be understood and appreciated from the embodiments provided herein that the content and extent of the present invention is not limited only by the specifics of the embodiments presented. Specifically, the use of LTCC for the design and implementation of any type of microfluidic element or system can be readily accomplished by the teachings presented herein.

What is claimed is:

1. A microfluidic device comprising:
   a plurality of low temperature co-fired ceramic (LTCC) layers aligned, stacked and bonded together forming groups of layers, wherein multiple groups of the plurality of LTCC layers are transitioned into a co-fired ceramic material and are aligned and bonded together to form the microfluidic device; and
   one or more semiconductor devices bonded to pre-determined surfaces of one or more LTCC layers of the plurality of LTCC layers, wherein:
   one or more LTCC layers of the plurality of LTCC layers include one or more openings of pre-determined sizes, shapes, and spatial locations for the containment of fluids;
   one or more LTCC layers of the plurality of LTCC layers include one or more openings of pre-determined sizes, shapes, and spatial locations for the placement of the one or more semiconductor devices;
   one or more LTCC layers of the plurality of LTCC layers include one or more openings of pre-determined sizes, shapes and spatial locations filled with an electrically conductive material to form electrical interconnection pathways through multiple LTCC layers of the plurality of LTCC layers;
   one or more LTCC layers of the plurality of LTCC layers include pre-determined patterns of electrical connections fabricated with an electrically conductive material on the surfaces of the LTCC layers and/or in the LTCC layers to form electrical interconnection pathways across LTCC layers;
   one or more LTCC layers of the plurality of LTCC layers include one or more openings of pre-determined sizes, shapes, and locations fabricated through the thickness of the LTCC layers to form fluidic inlet and outlet ports;
   one or more LTCC layers of the plurality of LTCC layers include one or more bonding material layers patterned with pre-determined sizes, shapes and locations on the surfaces for bonding of the one or more semiconductor devices onto one or more of the layers; and
   one or more LTCC layers of the plurality of LTCC layers include one or more bonding material layers patterned with pre-determined sizes, shapes and locations on the surfaces of the layers with the bonding of the groups of LTCC layers to one another.

2. The microfluidic device of claim 1, wherein the semiconductor device includes one or more of: a microvalve; a micropump; a mixer; a chemical reaction chamber; a check valve; a pressure sensor; a flow sensor; a temperature sensor; a chemical sensor; a biological sensor; a flow resistor; a flow integrator; a shear stress sensor; a material property sensor; a magnetic sensor; an electromagnetic sensor; a thermal sensor; a hall effect sensor; an integrated electronics and photonic circuit; an active electronic and photonic device; a diode; a photodiode; a photodetector; and/or a photoemitter.

3. The microfluidic device of claim 1, further comprising a micro-mechanical device and/or micro-electro-mechanical device including one or more of: a microvalve; a micropump; a mixer; a chemical reaction chamber; a check valve; a pressure sensor; a flow sensor; a temperature sensor; a chemical sensor; a biological sensor; a flow restrictor; a flow integrator; a shear stress sensor; a material property sensor; a magnetic sensor; an electromagnetic sensor; a thermal sensor; and/or a hall effect sensor, wherein the micro-mechanical device and/or micro-electro-mechanical device is disposed at least partially in an opening formed by the plurality of LTCC layers.

4. The microfluidic device of claim 1, wherein one or more LTCC layers of the plurality of LTCC layers include one or more passive components made into the layers and on the surfaces of the layers having pre-determined values of resistance, capacitance or inductance.

5. The microfluidic device of claim 1, further comprising microfluidic components including seals between bonding surfaces of the one or more semiconductor devices and the groups of LTCC layers.

6. The microfluidic device of claim 1, wherein one or more LTCC layers of the plurality of LTCC layers include one or more flow channels between the fluidic inlet and outlet ports.

7. The microfluidic device of claim 1, wherein one or more LTCC layers of the plurality of LTCC layers include one or more fluid chambers.

8. The microfluidic device of claim 1, further comprising vertical and horizontal electrical interconnections through LTCC layers of the plurality of LTCC layers to make electrical connections to the semiconductor device for supplying power, connect microfluidic components of the same or different semiconductor devices to one another, and provide for electrical signals to be transferred to and/or between the semiconductor devices, and/or to the outside of the microfluidic device.

9. The microfluidic device of claim 1, wherein the bonding of the one or more semiconductor devices is performed with an intermediary material layer.

10. The microfluidic device of claim 1, wherein the bonding of groups of LTCC layers to one another is performed with an intermediary material layer.

11. The microfluidic device of claim 1, wherein the bonding of the one or more semiconductor devices to one or more of the LTCC layer is performed using thermo-compression bonding.

12. The microfluidic device of claim 1, wherein the inlet and outlet ports are sized and shaped to facilitate making fluidic connections to the inlet and outlet ports.

13. The microfluidic device of claim 1, wherein the electrical connections made in and on the layers extend to exterior electrical contact pads provided on exterior surfaces of the microfluidic device.

* * * * *